(12) United States Patent
Ikeda

(10) Patent No.: US 8,130,286 B2
(45) Date of Patent: Mar. 6, 2012

(54) LUMINANCE SIGNAL GENERATION APPARATUS, LUMINANCE SIGNAL GENERATION METHOD, AND IMAGE CAPTURING APPARATUS

(75) Inventor: Eiichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 12/533,836

(22) Filed: Jul. 31, 2009

(65) Prior Publication Data

US 2010/0033600 A1   Feb. 11, 2010

(30) Foreign Application Priority Data

Aug. 6, 2008  (JP) ................................. 2008-203444

(51) Int. Cl.
*H04N 9/68* (2006.01)
(52) U.S. Cl. ...................................... 348/234
(58) Field of Classification Search .................... 348/234
See application file for complete search history.

(56) References Cited

U.S. PATENT DOCUMENTS

| | | | | |
|---|---|---|---|---|
| 4,949,166 | A * | 8/1990 | Isnardi | 348/493 |
| 6,195,125 | B1 * | 2/2001 | Udagawa et al. | 348/222.1 |
| 6,690,418 | B1 * | 2/2004 | Terasawa et al. | 348/235 |
| 6,816,193 | B1 | 11/2004 | Kohashi et al. | |
| 7,474,342 | B2 | 1/2009 | Kohashi et al. | |
| 7,474,343 | B2 | 1/2009 | Kohashi et al. | |
| 7,489,349 | B2 | 2/2009 | Kohashi et al. | |
| 2011/0211126 | A9 * | 9/2011 | Tsukioka | 348/631 |

FOREIGN PATENT DOCUMENTS

| | | |
|---|---|---|
| JP | 2003-196649 A | 7/2003 |
| JP | 2003-348609 A | 12/2003 |
| JP | 3699873 B | 9/2005 |
| JP | 2008-072377 A | 3/2008 |

* cited by examiner (Continued)

*Primary Examiner* — James Hannett
(74) *Attorney, Agent, or Firm* — Cowan, Liebowitz & Latman, P.C.

(57) ABSTRACT

A luminance signal in which the occurrence of spatial aliasing in a diagonal direction component has been suppressed for a red or blue imaging subject is generated from an image signal read from an image sensor. A V-LPF and a H-LPF generate a first luminance signal in which the spatial frequency bandwidth has been limited. Also, a V-LPF and a H-LPF, which limit the spatial frequency bandwidth so as to be even lower than the V-LPF and the H-LPF, generate a second luminance signal in which the bandwidth has been limited. A first GR weighted-addition circuit generates a final luminance signal for a pixel of interest by performing weighted-addition on the first luminance signal and the second luminance signal such that the ratio of the second luminance signal increases as the intensity of the redness or blueness of the pixel of interest increases.

11 Claims, 16 Drawing Sheets

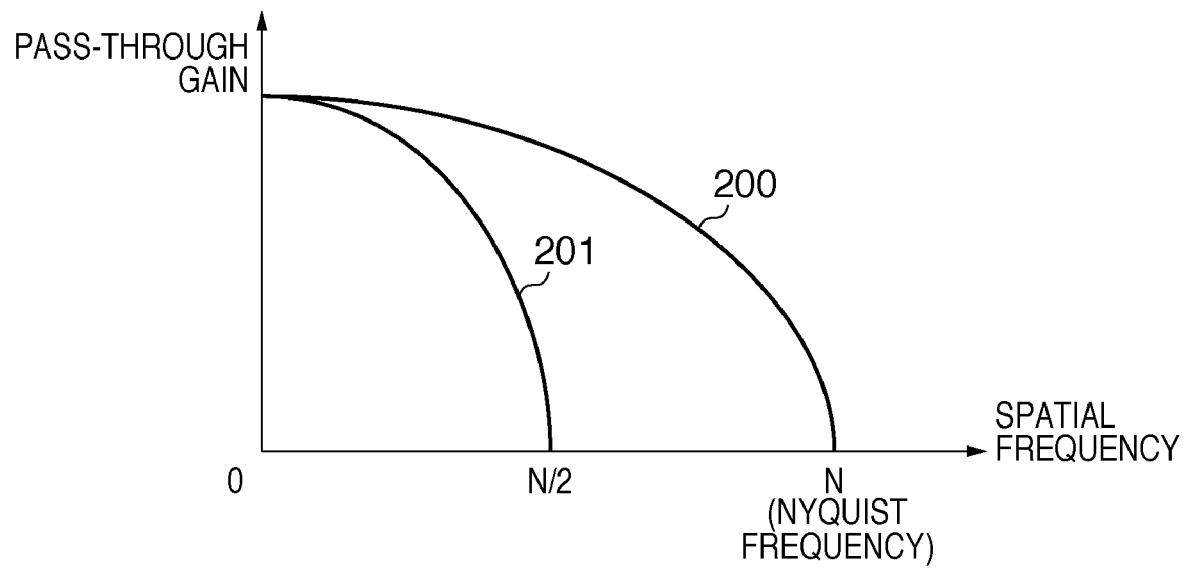

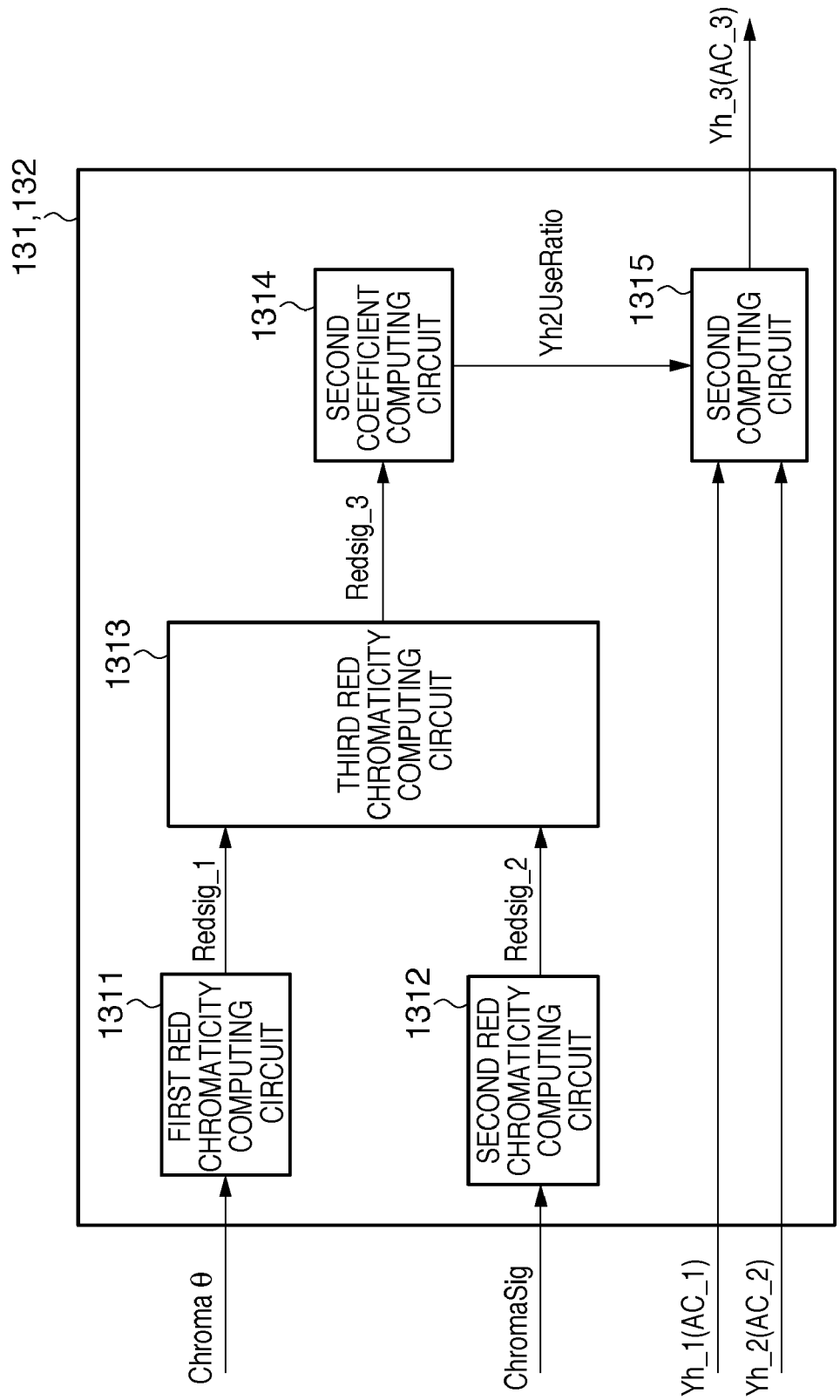

DiffH = |P21-P23| + |2×P22-P20-P24|
DiffV = |P12-P32| + |2×P22-P02-P42|

| P00 | P01 | P02 | P03 | P04 |
|-----|-----|-----|-----|-----|
| P10 | P11 | P12 | P13 | P14 |
| P20 | P21 | P22 | P23 | P24 |
| P30 | P31 | P32 | P33 | P34 |
| P40 | P41 | P42 | P43 | P44 |

LUMINANCE SIGNAL GENERATION APPARATUS, LUMINANCE SIGNAL GENERATION METHOD, AND IMAGE CAPTURING APPARATUS

BACKGROUND OF THE INVENTION

1. Field of the Invention

The present invention relates to a luminance signal generation apparatus, a luminance signal generation method, and an image capturing apparatus. The present invention particularly relates to an apparatus that generates a luminance signal from a signal obtained by an image sensor that uses a primary color Bayer pattern type of color filter array, a method for the same, and an image capturing apparatus that uses the apparatus and method.

2. Description of the Related Art

Since a color image is generated with use of an image sensor capable of detecting light quantities, such as a CCD image sensor or a CMOS image sensor, a configuration in which light is passed through a color filter array and then caused to incident on the image sensor is generally used.

There are various types of color filter arrays that differ according to colors used therein, the pattern of colors allocated to pixels, and the like, and primary colors (red, green, and blue) or complimentary colors (cyan, magenta, and yellow) are widely-used color types, and the Bayer pattern is widely used as the color pattern.

FIG. 20 is a diagram showing an exemplary configuration of a luminance signal generation circuit that realizes an OutOfGreen method for generating a luminance signal (OG signal) from only a green (G) signal, which is one of various conventional methods for generating a luminance signal with use of a primary color Bayer pattern type of color filter array. R represents red, G1 and G2 represent green, and B represents blue.

First, a 0-insertion circuit 2201 is applied to a RAW signal 2200 obtained by digitizing output (2204) from an image sensor, thereby setting the values of pixels other than the G pixels to 0 (2205). Next, a low-pass filter (V-LPF) circuit 2202 that limits the bandwidth in the vertical direction and a low-pass filter (H-LPF) circuit 2203 that limits the bandwidth in the horizontal direction are applied to obtain a luminance signal. Hereinafter, a luminance signal obtained using the OutOfGreen method is called an OG signal.

Another example of a conventional method for generating a luminance signal with use of a primary color Bayer pattern type of color filter array is an SWY method in which the signals of all RGB pixels are handled equally as a luminance signal (SWY signal).

FIG. 21 is a diagram showing an exemplary configuration of a luminance signal generation circuit that realizes the SWY method.

As is clear from a comparison with FIG. 20, the SWY method is a method of obtaining a luminance signal without using the 0-insertion circuit 2201 in the OutOfGreen method. Hereinafter, a luminance signal obtained using the SWY method is called an SWY signal.

FIG. 22 is a diagram showing the resolvable spatial frequency characteristics of an OG signal and an SWY signal.

The x-axis indicates the frequency space of an imaging subject in the horizontal (H) direction, the y-axis indicates the frequency space in the vertical (V) direction, and the spatial frequency increases with increasing distance from the origin point. In the case of an OG signal, a luminance signal is obtained from only the G signal, and therefore the resolution limit in the horizontal and vertical directions is equal to the Nyquist frequency of the image sensor (on the axis, $\pi/2$). However, since there are lines in which pixels do not exist in the diagonal directions, the limiting resolution frequency in the diagonal directions is lower than in the horizontal and vertical directions, and as a result, a diamond-shaped spatial frequency region 2400 is the resolvable spatial frequency.

On the other hand, in the case of an SWY signal, a signal is obtained using all pixels, and therefore when the imaging subject is achromatic, a square region 2401 as shown in FIG. 22 is the resolvable spatial frequency. However, in the exemplary case of a red imaging subject, a luminance signal is not output from pixels other than R pixels, and therefore resolution is only possible in a spatial frequency range 2402 that, when compared with an achromatic imaging subject, is half the range in the horizontal and vertical directions.

Japanese Patent Laid-Open No. 2003-348609 proposes a method in which diagonal regions 2403 of the OG signal in FIG. 22 are substituted with an SWY signal. However, since the resolution limit frequency of an SWY signal falls when the imaging subject is chromatic, the OG signal is replaced with the SWY signal only if the diagonal regions 2403 pertain to an achromatic image subject. Thereafter, an edge emphasis component is detected with use of the generated luminance signal and added to the luminance signal, thus generating a final luminance signal.

Japanese Patent Laid-Open No. 2003-196649 proposes a method in which a plurality of pre-provided interpolation filters are used differently depending on the angle of the imaging subject when generating a luminance signal, and then the luminance signal is edge-emphasized, thus generating a final luminance signal.

Also Japanese Patent No. 3699873 proposes a method in which, similarly to Japanese Patent Laid-Open No. 2003-348609, weighted-addition is performed on an OG signal and an SWY signal according to the hue and chroma of the imaging subject. Specifically, an SWY signal is used for a low-chroma imaging subject, an SWY signal is used for a high-chroma imaging subject as well as an Mg (magenta) and a G (green) imaging subject, and an OG signal is used for other chromatic imaging subjects. Thereafter, an edge emphasis component is computed with use of a MIX signal and added to a separately generated luminance signal, thus generating a final luminance signal.

Furthermore, in a method disclosed in Japanese Patent Laid-Open No. 2008-72377, a first high-frequency signal is generated with use of an OG signal, and a second high-frequency signal is generated with use of a luminance signal that has been generated from signals of all colors of pixels using an angle-adaptive SWY method that limits the bandwidth in not only the horizontal and vertical directions, but also the diagonal directions. Weighted-addition is then performed on the first high-frequency signal and the second high-frequency signal according to the spatial frequency of the signal to generate a third high-frequency signal, and the OG signal and the third high-frequency signal are added together, thus generating a final luminance signal.

However, when the technique disclosed in Japanese Patent Laid-Open No. 2003-348609 is applied to a signal obtained using a primary color Bayer pattern type of color filter array, there is the adverse effect in which a spurious resolution signal (spatial aliasing) is generated in the vicinity of the 45-degree and 135-degree directions when using an SWY signal generated by the luminance signal generation circuit shown in FIG. 21. This is thought to be due to the fact that in the circuit shown in FIG. 21, the bandwidth is limited in only the H direction and the V direction, and therefore the bandwidth is not sufficiently limited in the 45-degree and 135-degree diagonal directions.

Also, since an OG signal is used for a chromatic imaging subject, the resolution in the diagonal directions is not improved for chromatic imaging subjects. Furthermore, when an edge-emphasized signal is generated using a luminance signal in which portions (diagonal regions 2403) of the OG signal have been substituted with an SWY signal, portions where there is a switch between the OG signal and the SWY signal are emphasized, and an unnatural texture readily appears.

Also, in the technique disclosed in Japanese Patent Laid-Open No. 2003-196649, it is necessary to provide in advance and hold a plurality of interpolation filters corresponding to imaging subject angles. When the color space is set to, for example, NTSC-RGB, it is necessary to prepare an interpolation filter that maintains R:G:B=3:6:1, which is the luminance signal composition ratio. This results in the problem that the coefficient of the filter is limited, and it is impossible to perform filter processing that is optimal for the angle of the imaging subject. Similarly to Japanese Patent Laid-Open No. 2003-348609, since edge emphasizing is performed after mixing luminance signals computed using a plurality of interpolation methods, subtle switches between luminance signals computed using different methods become emphasized.

In the technique disclosed in Japanese Patent No. 3699873, an SWY signal is used in place of an OG signal only in the case of Mg and G imaging subjects, and therefore there is no improvement in the resolution of chromatic imaging subjects other than Mg and G imaging subjects. Furthermore, similarly to the techniques disclosed in Japanese Patent Laid-Open No. 2003-348609 and Japanese Patent Laid-Open No. 2003-196649, since edge emphasizing is performed after weighted-addition has been performed on luminance signals computed using a plurality of techniques, portions where there is a switch between methods become emphasized.

In Japanese Patent Laid-Open No. 2008-72377, image quality deterioration with a red imaging subject is suppressed, and therefore a red region is detected, and a final luminance signal is generated with use of a first high-frequency signal generated from an OG signal for that region. For this reason, there are problems such as the phenomenon in which a red imaging subject becomes blurred (in particular, blonde hair that is difficult to distinguish from red becomes blurred), and spatial aliasing of red diagonal lines cannot be eliminated.

The same problem occurs with blue imaging subjects depending on the spectral distribution characteristics of the color filter array.

SUMMARY OF THE INVENTION

The present invention has been achieved in view of the above problems in conventional technology. A first aspect of the present invention provides a luminance signal generation apparatus and a luminance signal generation method that can suppress the occurrence of spatial aliasing in diagonal direction components with red and blue imaging subjects.

According to an aspect of the present invention, there is provided a luminance signal generation apparatus that generates a luminance signal for each pixel from an image signal read from an image sensor that includes a primary color Bayer pattern type of color filter array, the luminance signal generation apparatus comprising: a first signal generating unit configured to generate a first signal from a first image signal that was generated by limiting a spatial frequency bandwidth of the image signal; a second signal generating unit configured to generate a second signal from a second image signal that was generated by limiting the spatial frequency bandwidth of the image signal to a lower bandwidth than the first image signal; a computing unit configured to compute, from the image signal read from the image sensor, a color intensity measure for a pixel of interest, the measure indicating an intensity of a predetermined color of the pixel of interest; and a first adding unit configured to generate an output luminance signal for the pixel of interest using a third signal that was generated by adding the first signal and the second signal such that, based on the color intensity measure, the second signal is weighted more as the intensity of the predetermined color of the pixel of interest increases.

According to another aspect of the present invention, there is provided an image capturing apparatus comprising: an image sensor including a primary color Bayer pattern type of color filter array; and the luminance signal generation apparatus according to the present invention.

According to a further aspect of the present invention, there is provided a luminance signal generation method for generating a luminance signal for each pixel from an image signal read from an image sensor that includes a primary color Bayer pattern type of color filter array, the luminance signal generation method comprising: a first luminance signal generating step of generating a first signal from a first image signal that was generated by limiting a spatial frequency bandwidth of the image signal read from the image sensor; a second luminance signal generating step of generating a second signal from a second image signal that was generated by limiting the spatial frequency bandwidth of the image signal read from the image sensor to a lower bandwidth than the first image signal; a computing step of computing, from the image signal read from the image sensor, a color intensity measure for a pixel of interest, the measure indicating an intensity of a predetermined color of the pixel of interest; and a first adding step of generating an output luminance signal for the pixel of interest with a third signal that was generated by adding the first signal and the second signal such that, based on the color intensity measure, the second signal is weighted more as the intensity of the predetermined color of the pixel of interest increases.

Further features of the present invention will become apparent from the following description of exemplary embodiments with reference to the attached drawings.

BRIEF DESCRIPTION OF THE DRAWINGS

FIG. 2 is a diagram showing an example of the frequency characteristics of low-pass filters used in the luminance signal generation apparatus according to Embodiment 1 of the present invention.

FIGS. 3A to 3D are diagrams showing examples of the coefficients of two-dimensional spatial filters used in the luminance signal generation apparatus according to Embodiment 1 of the present invention.

FIG. 8 is a block diagram showing an exemplary configuration of a first and second GR weighted-addition circuit in Embodiment 1 of the present invention.

DESCRIPTION OF THE EMBODIMENTS

Preferred embodiments of the present invention will now be described in detail in accordance with the accompanying drawings.

Embodiment 1

Figure 1:
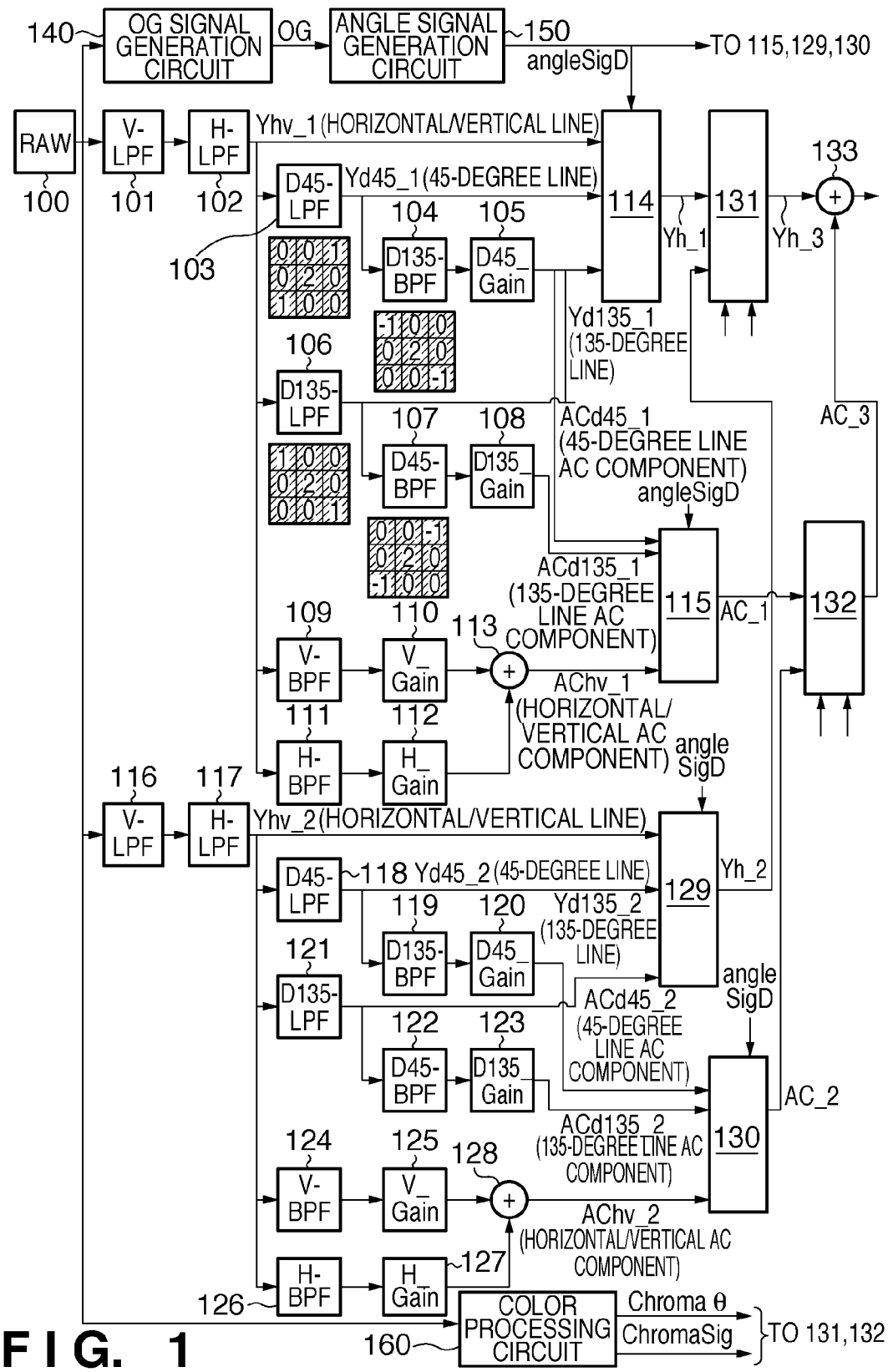
FIG. 1 is a block diagram showing an exemplary configuration of a luminance signal generation apparatus according to Embodiment 1 of the present invention.

FIG. 1 is a block diagram showing an exemplary configuration of a luminance signal generation apparatus according to Embodiment 1 of the present invention. The luminance signal generation apparatus according to the present embodiment can be suitably realized by a signal processing circuit that performs signal processing such as so-called developing processing in an image capturing apparatus that uses an image sensor including a primary color Bayer pattern type of color filter array.

Also, the luminance signal generation apparatus generates a luminance signal for each pixel using image signals for each pixel that have been read from the image sensor. Therefore, although not particularly mentioned, the processing described below is executed for each pixel of interest as the pixel of interest is sequentially updated.

(Computation of first luminance signal) An image signal is read from the image sensor (not shown) including a primary color Bayer pattern type of color filter array, digitized and subjected to white balance processing, and the resulting image signal is received as input of a RAW signal 100.

A vertical low-pass filter (V-LPF) 101 and a horizontal low-pass filter (H-LPF) 102, which are first low-pass filters, limit the horizontal and vertical direction bandwidth of the RAW signal 100 and generate a luminance signal Yhv_1.

FIG. 2 is a diagram showing an example of the frequency characteristics of the low-pass filters used in the luminance signal generation apparatus according to the present embodiment. In FIG. 2, the x-axis indicates spatial frequency, and the y-axis indicates pass-through gain. The V-LPF 101 and the H-LPF 102 have a frequency characteristic 200 in which the gain is 0 at the Nyquist frequency N of the image sensor. On the other hand, as will be described later, a V-LPF 116 and an H-LPF 117 have a frequency characteristic 201 in which the gain is 0 at half the Nyquist frequency N of the image sensor (N/2).

Normally, the V-LPF 101 and the H-LPF 102 that have the frequency characteristic 200 are applied to a monochrome (achromatic) imaging subject.

The luminance signal Yhv_1 output from the H-LPF 102 is provided to a first HVD weighted-addition circuit 114. The luminance signal Yhv_1 is also provided to two-dimensional low-pass filters D45-LPF 103 and D135-LPF 106, and to a vertical band-pass filter (V-BPF) 109 and a horizontal band-pass filter (H-BPF) 111.

FIGS. 3A to 3D are diagrams showing examples of coefficients of the two-dimensional spatial filters used in the luminance signal generation apparatus according to the present embodiment. FIGS. 3A and 3B show examples of the coefficients of the D45-LPF 103 and the D135-LPF 106 respectively, and FIGS. 3C and 3D show examples of the coefficients of a later-described D135-BPF 104 and a later-described D45-BPF 107 respectively.

The D45-LPF 103 generates a luminance signal Yd45_1 in which the 45-degree direction bandwidth of the luminance signal Yhv_1 has been limited, and provides the luminance signal Yd45_1 to the first HVD weighted-addition circuit 114.

The D135-LPF 106 generates a luminance signal Yd135_1 in which the 135-degree direction bandwidth of the luminance signal Yhv_1 has been limited, and provides the luminance signal Yd135_1 to the first HVD weighted-addition circuit 114.

The first HVD weighted-addition circuit 114 performs weighted-addition on the luminance signal Yhv_1 in which the horizontal and vertical direction ndwidth has been limited, and either the luminance signal Yd45_1 in which furthermore the 45-degree direction bandwidth has been limited or the luminance signal Yd135_1 in which furthermore the 135-degree direction bandwidth has been limited, thus generating a first luminance signal Yh_1.

The following describes the weighted-addition method performed by the first HVD weighted-addition circuit 114.

The first HVD weighted-addition circuit 114 performs weighted-addition on the three luminance signals with use of a weighted-addition coefficient corresponding to the angle of the imaging subject.

Figure 20:
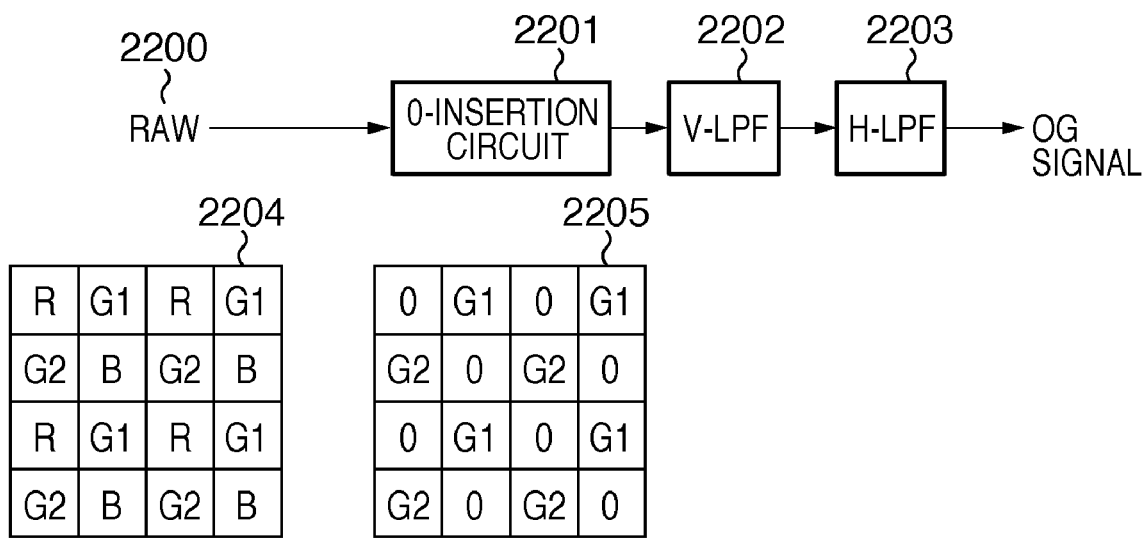
FIG. 20 is a block diagram showing an exemplary configuration of a luminance signal generation circuit according to an OG method.
Figure 21:
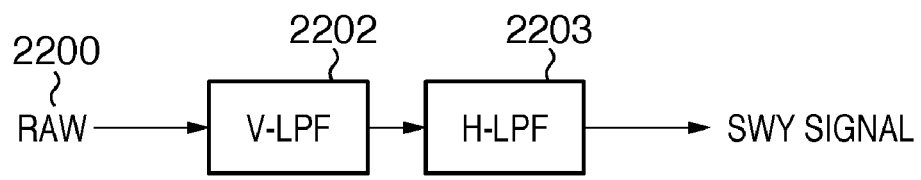
FIG. 21 is a block diagram showing an exemplary configuration of a luminance signal generation circuit according to an SWY method.
Figure 22:
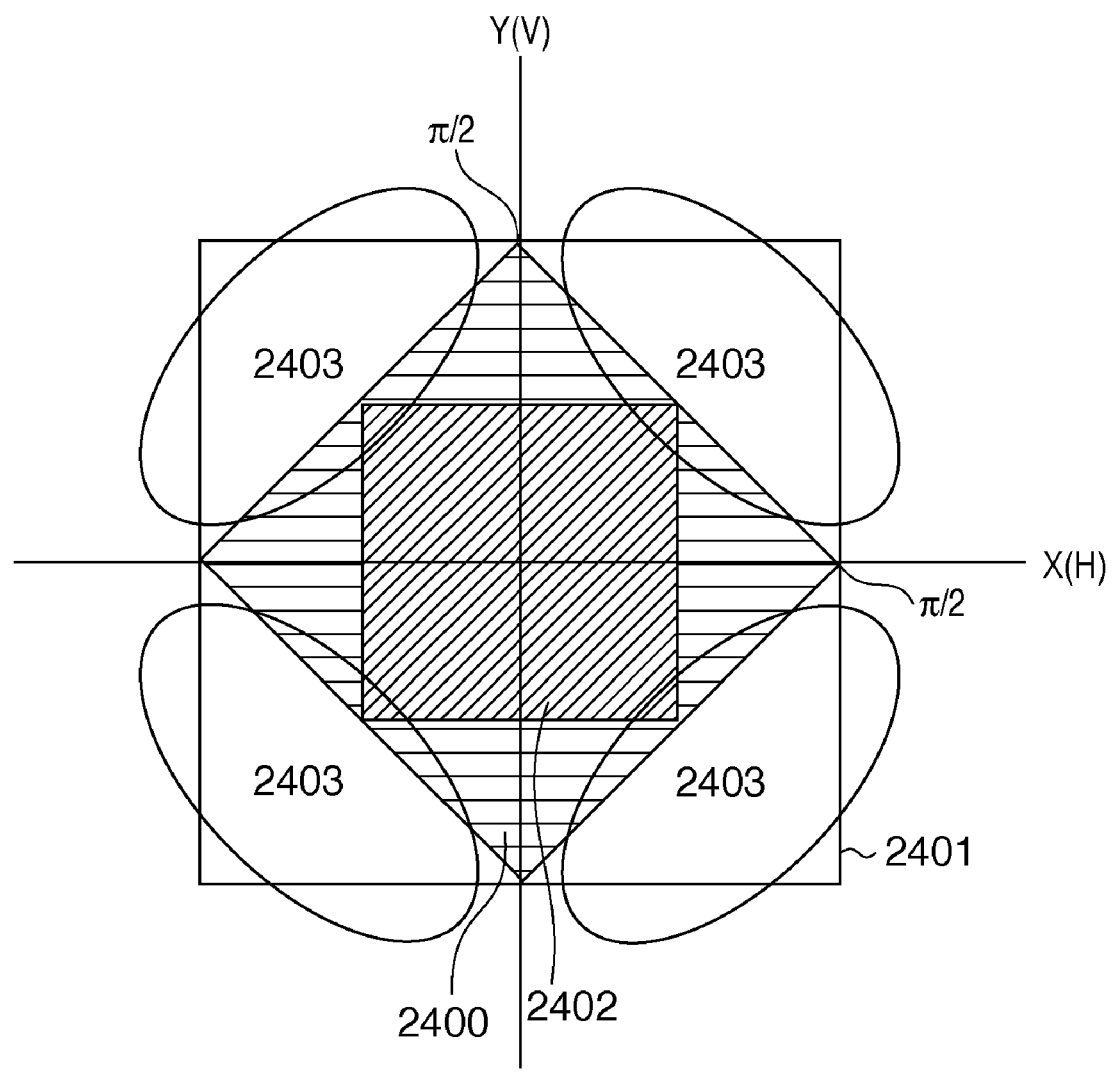
FIG. 22 is a diagram showing the resolvable spatial frequency characteristics of an OG signal and an SWY signal.

First, an OG signal generation circuit 140 generates an OG signal from the RAW signal 100. The OG signal generation circuit 140 generates the OG signal using the method described with reference to FIG. 20. An angle signal generation circuit 150 generates an angle signal angleSigD that indicates the angle of the imaging subject from the OG signal, and provides the angle signal angleSigD to the first HVD weighted-addition circuit 114.

Figure 4:
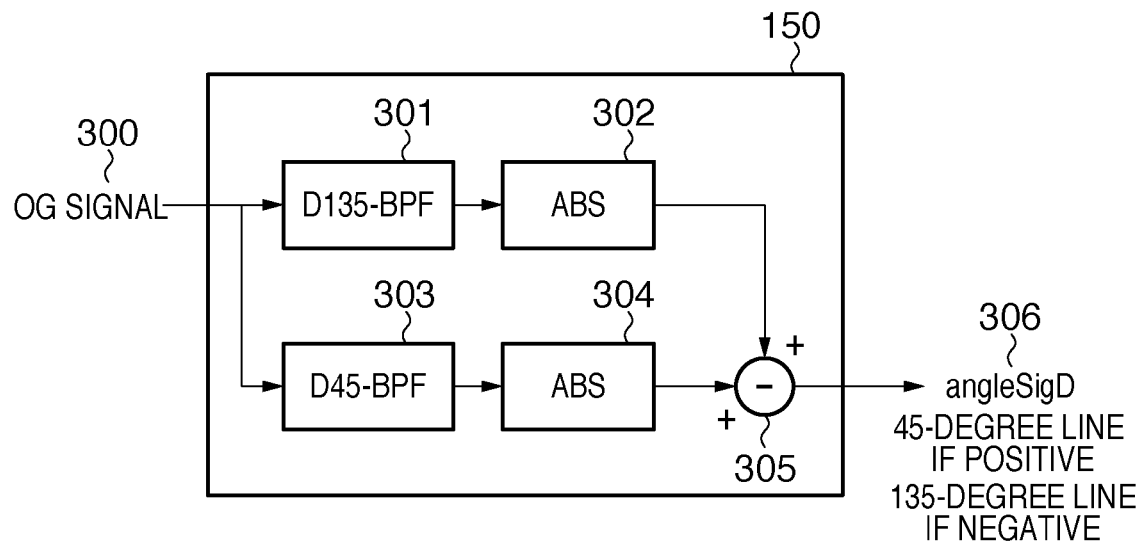
FIG. 4 is a block diagram showing an exemplary configuration of an angle signal generation circuit in Embodiment 1 of the present invention.

FIG. 4 is a block diagram showing an exemplary configuration of the angle signal generation circuit. An OG signal 300 is input to a D135-BPF 301 and a D45-BPF 303, which are two-dimensional band-pass filters. The D135-BPF 301 and the D45-BPF 303 have the coefficients shown in FIGS. 3C and 3D respectively, and emphasize a 45-degree line and a 135-degree line.

An absolute value circuit (ABS) 302 and an absolute value circuit (ABS) 304 generate a 45-degree line detection signal and a 135-degree line detection signal respectively from the output of the D135-BPF 301 and the D45-BPF 303.

A subtraction circuit 305 subtracts the 135-degree line detection signal output by the ABS 304 from the 45-degree line detection signal output by the ABS 302, thus obtaining an angle signal (angleSigD) 306 as the subtraction result. The angle signal angleSigD represents a 45-degree line if positive and represents a 135-degree line if negative. Also, a region for which the output signal has a small amplitude represents a horizontal or vertical line.

Figure 5:
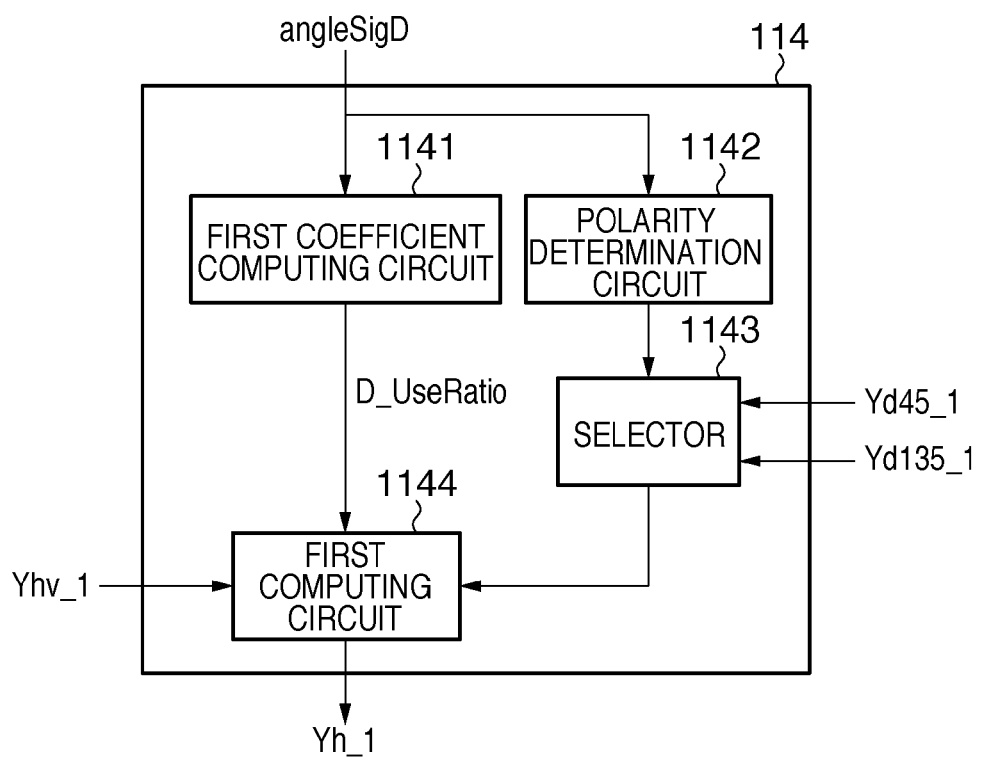
FIG. 5 is a block diagram showing an exemplary configuration of a first HVD weighted-addition circuit in Embodiment 1 of the present invention.

FIG. 5 is a block diagram showing an exemplary configuration of the first HVD weighted-addition circuit 114.

A first coefficient computing circuit 1141 obtains a weighted-addition coefficient D_UseRatio based on the value of the angle signal angleSigD, and outputs the weighted-addition coefficient D_UseRatio. A polarity determination circuit 1142 determines the polarity of the angle signal angleSigD, and by controlling a selector 1143 based on the polarity (positive/negative), provides either the luminance signal Yd45_1 or the luminance signal Yd135_1 to a first computing circuit 1144. Specifically, the polarity determination circuit 1142 controls the selector 1143 so that the luminance signal Yd45_1 is provided to the first computing circuit 1144 if the polarity of the angle signal angleSigD is positive, and the luminance signal Yd135_1 is provided to the first computing circuit 1144 if the polarity of the angle signal angleSigD is negative.

With use of the weighted-addition coefficient D_UseRatio from the first coefficient computing circuit 1141, the first computing circuit 1144 performs weighted-addition on the luminance signal Yhv_1 and either the luminance signal Yd45_1 or the luminance signal Yd135_1, thus computing the first luminance signal Yh_1.

Figure 6:
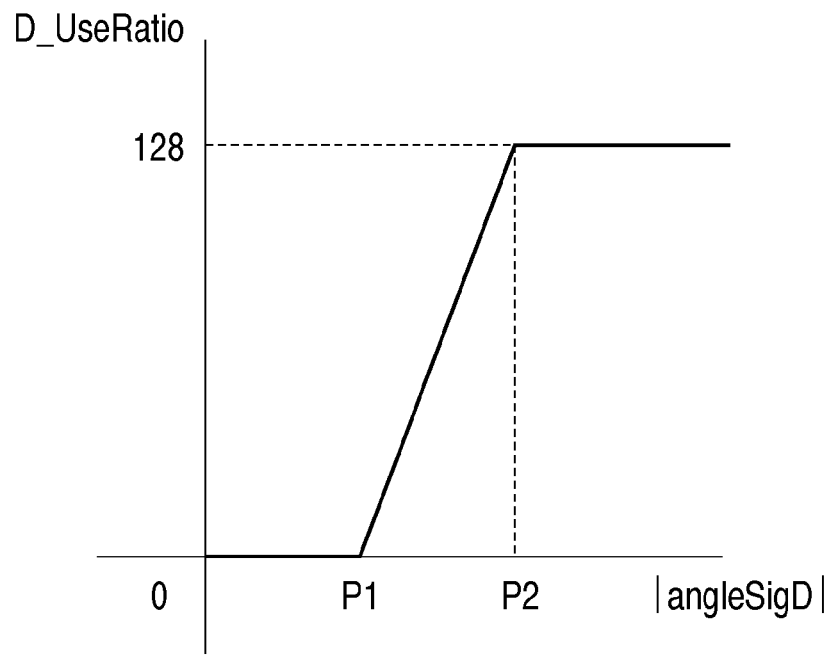
FIG. 6 is a diagram showing an example of the input/output characteristics of a first coefficient computing circuit in FIG. 5.

FIG. 6 is a diagram showing an example of the input/output characteristics of the first coefficient computing circuit 1141.

If the absolute value (amplitude) of the angle signal angleSigD is greater than or equal to 0 and less than or equal to a preset threshold value P1 (0≦|angleSigD|≦P1), the angle signal angleSigD is a vertical or horizontal signal, and therefore the first coefficient computing circuit 1141 sets the coefficient D_UseRatio to 0. On the other hand, in the case of a section of the angle signal angleSigD whose absolute value is greater than or equal to a threshold value P2 (P2≦|angleSigD|) indicating a completely diagonal signal, the first coefficient computing circuit 1141 sets the coefficient D_UseRatio to 128. Furthermore, in the case of a section of the angle signal angleSigD whose absolute value is greater than the threshold value P1 and less than the threshold value P2 (P1≦|angleSigD|≦P2), the first coefficient computing circuit 1141 outputs a value obtained by linear interpolation.

In this way, the first coefficient computing circuit 1141 obtains the weighted-addition coefficient D_UseRatio based on the absolute value of the angle signal |angleSigD|, and provides the weighted-addition coefficient D_UseRatio to the first computing circuit 1144.

The first computing circuit 1144 generates the first luminance signal Yh_1 with use of the following expressions (1-1) and (1-2).

When angleSigD is positive, $$Yh\_1=(Yhv\_1\times(128-D\_UseRatio)+ Yd45\_1\times D\_UseRatio)/128 \quad (1\text{-}1)$$

When angleSigD is negative, $$Yh\_1=(Yhv\_1\times(128-D\_UseRatio)+ Yd135\_1\times D\_UseRatio)/128 \quad (1\text{-}2)$$

Here, Yhv_1 indicates a luminance signal in which the horizontal and vertical bandwidth has been limited, Yd45_1 indicates a 45-degree luminance signal in which furthermore the 45-degree direction bandwidth has been limited, and Yd135_1 indicates a 135-degree luminance signal in which furthermore the 135-degree direction bandwidth has been limited.

(Computation of First High-Frequency Signal)

The vertical band-pass filter (V-BPF) 109 and the horizontal band-pass filter (H-BPF) 111 detect a vertical and horizontal direction edge component in the luminance signal Yhv_1 in which the vertical and horizontal direction bandwidth has been limited by the V-LPF 101 and the H-LPF 102. A vertical gain circuit (V-Gain) 110 and a horizontal gain circuit (H-Gain) 112 multiply the respective edge components by a pre-set gain, and the resulting edge components are added by an addition circuit 113, thus generating a first horizontal/vertical edge signal (high-frequency signal) AChv_1.

The D135-BPF 104 (coefficient shown in FIG. 3C), which detects a 135-degree direction AC component (edge component or high-frequency component), extracts a 45-degree line edge component from the luminance signal in which furthermore the 45-degree direction bandwidth has been limited by the D45-LPF 103. Thereafter, gain adjustment is performed by a gain circuit 105, and a 45-degree line edge signal ACd45_1 is computed. Similarly, the D45-BPF 107 (coefficient shown in FIG. 3D) extracts a 135-degree direction edge component from the luminance signal in which furthermore the 135-degree direction bandwidth has been limited by the D135-LPF 106. Thereafter, gain adjustment is performed by a gain circuit 108, and a 135-degree line edge signal ACd135_1 is computed.

A second HVD weighted-addition circuit 115 performs weighted-addition according to the following expressions (1-3) and (1-4) on the three edge signals with use of the weighted-addition coefficient D_UseRatio used during generation of the first luminance signal Yh_1, thus generating the first high-frequency signal AC_1.

When angleSigD is positive, $$AC\_1=(AChv\_1\times(128-D\_UseRatio)+ ACd45\_1\times D\_UseRatio)/128 \quad (1\text{-}3)$$

When angleSigD is negative, $$AC\_1=(AChv\_1\times(128-D\_UseRatio)+ ACd135\_1\times D\_UseRatio)/128 \quad (1\text{-}4)$$

The second HVD weighted-addition circuit 115 may have the same configuration as the first HVD weighted-addition circuit 114 shown in FIG. 5, with the exception that AChv_1, ACd45_1, and ACd135_1 are received as input in place of Yhv_1, Yd45_1, and Yd135_1. Also, the weighted-addition coefficient D_UseRatio and polarity information pertaining to the angle signal angleSigD can be acquired from the first HVD weighted-addition circuit 114. In this case, the first coefficient computing circuit 1141 and the polarity determination circuit 1142 are unnecessary.

(Computation of Second Luminance Signal (for a Red Imaging Subject))

Although a second luminance signal for a red imaging object is generated through processing that is similar to the generation of the first luminance signal, there is a difference in the processing with respect to the characteristics of the bandwidth limiting filters.

The V-LPF 116 and the H-LPF 117 respectively limit the vertical and horizontal direction bandwidth of the RAW signal 100. The V-LPF 116 and the H-LPF 117, which are second low-pass filters, have the frequency characteristic 201 shown in FIG. 2. Specifically, the bandwidth of the RAW signal 100 is limited to approximately half the frequency characteristic 200 of the V-LPF 101 and the H-LPF 102 (approximately half the Nyquist frequency of the image sensor).

The reason for this is that, in the case of a primary color filter array, particularly with a red imaging object, the output signal value from green pixels and blue pixels is substantially 0, and therefore the Nyquist frequency due to spatial sampling by the image sensor becomes half that of a normal achromatic imaging subject in both the vertical direction and the horizontal direction.

A luminance signal Yhv 2 output from the H-LPF 117 is processed similarly to the luminance signal Yhv_1, and a second luminance signal Yh_2 and a second high-frequency signal AC_2 are generated by a third and fourth weighted-addition circuit 129 and 130 respectively.

Specifically, the luminance signal Yhv_2 is provided to the third HVD weighted-addition circuit 129 as a signal Yd45_2 and a signal Yd135_2 in which the 45-degree direction bandwidth and the 135-degree direction bandwidth have been limited by a D45-LPF 118 and a D135-LPF 121 respectively. The luminance signal Yhv_2 is also provided as-is to the third HVD weighted-addition circuit 129.

The third HVD weighted-addition circuit 129 has a similar configuration to the first HVD weighted-addition circuit 114, and computes a weighted-addition coefficient D_UseRatio from the angle signal angleSigD. The third HVD weighted-addition circuit 129 then generates the second luminance signal Yh_2 using the following expressions (1-5) and (1-6).

When angleSigD is positive, $$Yh\_2=(Yhv\_2\times(128D\_UseRatio)+ Yd45\_2\times D\_UseRatio)/128 \quad (1\text{-}5)$$

When angleSigD is negative, $$Yh\_2=(Yhv\_2\times(128-D\_UseRatio)+ Yd135\_2\times D\_UseRatio)/128 \quad (1\text{-}6)$$

Here, Yhv_2 indicates a luminance signal in which the horizontal and vertical bandwidth has been limited, Yd45_2 indicates a 45-degree luminance signal in which the 45-degree direction bandwidth has been further limited, and Yd135_2 indicates a 135-degree luminance signal in which the 135-degree direction bandwidth has been further limited. The difference in vertical and horizontal direction bandwidth limiting between these signals and Yhv_1, Yd45_1, and Yd135_1 is as described above.

(Computation of Second High-Frequency Signal (For a Red Imaging Subject))

A vertical band-pass filter (V-BPF) 124 and a horizontal band-pass filter (H-BPF) 126 detect a vertical and horizontal direction edge component in the luminance signal Yhv_2 in which the vertical and horizontal direction bandwidth has been limited by the V-LPF 116 and the H-LPF 117. A vertical gain circuit (V-Gain) 125 and a horizontal gain circuit (H-Gain) 127 multiply the respective edge components by a pre-set gain, and the resulting edge components are added by an addition circuit 128, thus generating a second horizontal/vertical edge signal (high-frequency signal) AChv_2.

A D135-BPF 119 (coefficient shown in FIG. 3C), which detects a 135-degree direction AC component (edge component or high-frequency component), extracts a 45-degree line edge component from the luminance signal in which the 45-degree direction bandwidth has been further limited by the D45-LPF 118. Thereafter, gain adjustment is performed by a gain circuit 120, and a 45-degree line edge signal ACd45_2 is computed. Similarly, a D45-BPF 122 (coefficient shown in FIG. 3D) extracts a 135-degree direction edge component from the luminance signal in which the 135-degree direction bandwidth has been further limited by the D135-LPF 121. Thereafter, gain adjustment is performed by a gain circuit 123, and a 135-degree line edge signal ACd135_2 is computed.

The fourth HVD weighted-addition circuit 130 performs weighted-addition according to the following expressions (1-7) and (1-8) on the three edge signals with use of the weighted-addition coefficient D_UseRatio used during generation of the second luminance signal Yh_2, thus generating the second high-frequency signal AC_2.

When angleSigD is positive, $$AC\_2=(AChv\_2\times(128-D\_UseRatio)+ ACd45\_2\times D\_UseRatio)/128 \quad (1\text{-}7)$$

When angleSigD is negative, $$AC\_2=(AChv\_2\times(128-D\_UseRatio)+ ACd135\_2\times D\_UseRatio)/128 \quad (1\text{-}8)$$

The fourth HVD weighted-addition circuit 130 may have the same configuration as the first HVD weighted-addition circuit 114 shown in FIG. 5, with the exception that AChv_2, ACd45_2, and ACd135_2 are received as input in place of Yhv_1, Yd45_1, and Yd135_1. Also, the weighted-addition coefficient D_UseRatio and polarity information pertaining to the angle signal angleSigD can be acquired from the third HVD weighted-addition circuit 129. In this case, the first coefficient computing circuit 1141 and the polarity determination circuit 1142 are unnecessary.

(Weighted-Addition of First and Second Luminance Signals and High-Frequency Signals)

A first GR weighted-addition circuit 131 performs weighted-addition on the first luminance signal Yh_1 and the second luminance signal Yh_2 that were generated by the first and third HVD weighted-addition circuits 114 and 129 respectively, thus obtaining a third luminance signal Yh_3.

The first GR weighted-addition circuit 131 in the present embodiment 100% uses the first luminance signal Yh_1 in the case of a normal imaging subject other than a red imaging subject. In the case of a red imaging subject, the first GR weighted-addition circuit 131 100% uses the second luminance signal Yh_2 in which the vertical direction and horizontal direction bandwidth have been limited to half that of the first luminance signal Yh_1.

By performing weighted-addition in this way, in the case of using information from all pixels when generating a luminance signal in an image capturing apparatus including a primary color filter array (e.g., the case of using the SWY method), it is possible to generate a luminance signal in which the occurrence of spatial aliasing has been sufficiently suppressed for even a red imaging subject.

Figure 7:
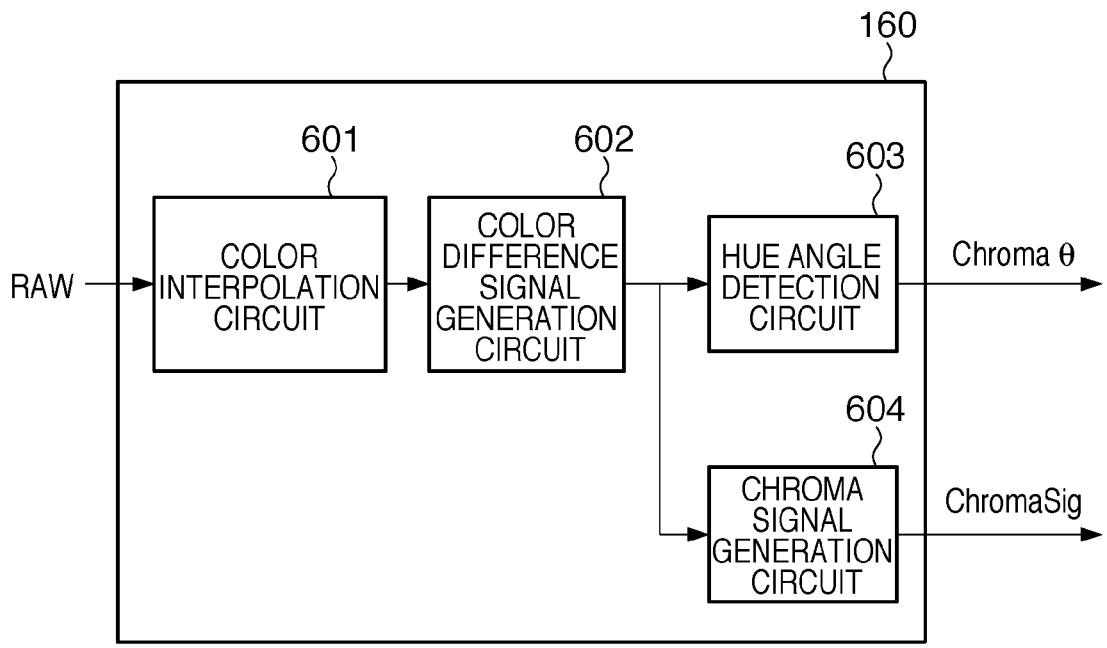
FIG. 7 is a block diagram showing an exemplary configuration of a color processing circuit in Embodiment 1 of the present invention.

FIG. 7 is a block diagram showing an exemplary configuration of a color processing circuit 160 shown in FIG. 1.

With use of the RAW signal 100, the color processing circuit 160 generates a hue angle signal Chromaθ and a chroma signal ChromaSig as signals for determining the redness of the imaging subject, and provides the hue angle signal Chromaθ and the chroma signal ChromaSig to the first GR weighted-addition circuit 131 and a second GR weighted-addition circuit 132.

As shown in FIG. 7, a color interpolation circuit 601 performs an interpolation operation (low-pass filter processing) on the RAW signal 100 for each pixel, and thereafter a color difference signal generation circuit 602 converts the resulting signals into a R-Y (Ry) signal and a B-Y (By) signal, which are color difference signals.

A hue angle detection circuit 603 applies the following expression (1-9) to the color difference signals generated for each pixel, thus generating a hue angle signal Chromaθ.

$$\text{Chroma}\theta=\tan^{-1}(Ry/By)$$

$$Ry=R-Y \quad (1\text{-}9)$$

$$By=B-Y$$

Also, a chroma computing circuit 604 applies the following expression (1-10) to the color difference signals generated by the color difference signal generation circuit 602, thus generating the chroma signal ChromaSig.

$$\text{ChromaSig}=\sqrt{Ry^2+By^2} \quad (1\text{-}10)$$

The hue angle signal Chromaθ and the chroma signal ChromaSig generated by the color processing circuit 160 are output to the first and second GR weighted-addition circuits 131 and 132.

FIG. 8 is a block diagram showing an exemplary configuration of the first and second GR weighted-addition circuits 131 and 132.

Figure 9A:
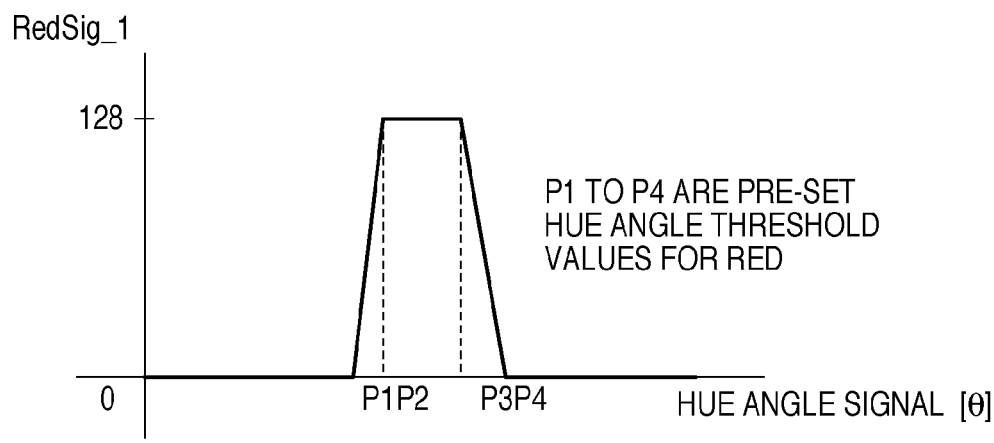
FIG. 9A is a diagram showing an example of the input/output characteristics of a first red chromaticity computing circuit in FIG. 8.

A first red chromaticity computing circuit 1311 has the input/output characteristics shown in FIG. 9A, and converts the hue angle signal Chromaθ into a first red chromaticity RedSig_1 as one measure indicating the redness of the imaging subject.

In the example shown in FIG. 9A, if the value of the hue angle signal Chromaθ is in the range of 0 to the predetermined threshold value P1 inclusive (Chromaθ≦P1) and is greater than or equal to a threshold value P4 (P4≦Chromaθ), the first red chromaticity RedSig_1 is set to 0, which indicates a color other than red. On the other hand, if the value of the hue angle signal Chromaθ is in the range of a threshold value P2 to a threshold value P3 inclusive (P2≦Chromaθ≦P3), the first red chromaticity RedSig_1 is set to 128, which indicates red. If the value of the hue angle signal Chromaθ is in another range (P1<Chromaθ<P2, P3<Chromaθ<P4), the first red chromaticity RedSig_1 is set to a value obtained by performing linear interpolation between 128 and 0, and output. P1 to P4 can be predetermined as red chromaticity threshold values.

Figure 9B:
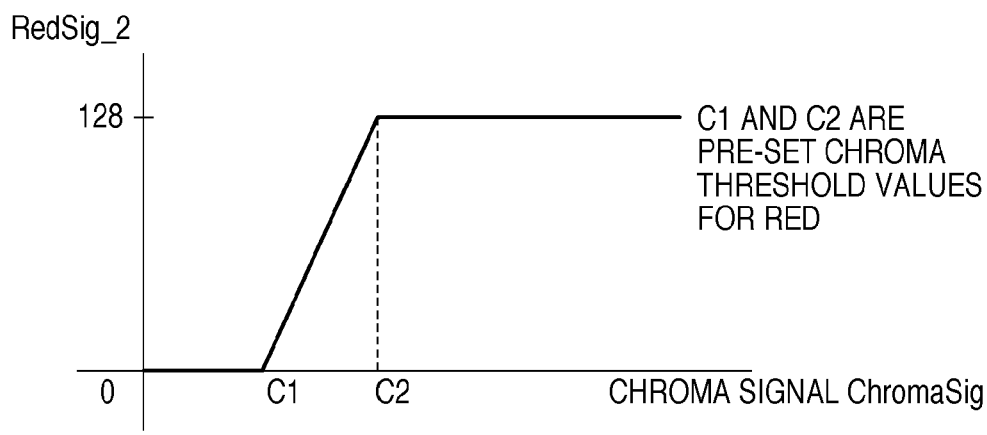
FIG. 9B is a diagram showing an example of the input/output characteristics of a second red chromaticity computing circuit in FIG. 8.

A second red chromaticity computing circuit 1312 has the input/output characteristics shown in FIG. 9B, and converts the chroma signal ChromaSig into a second red chromaticity RedSig_2, which is one measure indicating the degree of redness of the imaging subject.

In the example shown in FIG. 9B, if the value of the chroma signal ChromaSig is in the range of 0 to a predetermined threshold value C1 inclusive (ChromaSig≦C1), the chroma is low and there has been influence from noise, and therefore the second red chromaticity RedSig_2 is set to 0. If the value of the chroma signal ChromaSig is greater than or equal to a threshold value C2 (C2≦ChromaSig), the second red chromaticity RedSig_2 is set to 128, which indicates red. If the value of the chroma signal ChromaSig is in another range (C1<ChromaSig<C2), the second red chromaticity RedSig_2 is set to a value obtained by performing linear interpolation between 128 and 0, and output. C1 and C2 can be predetermined as red chromaticity threshold values.

A third red chromaticity computing circuit 1313 multiplies the first red chromaticity RedSig_1 and the second red chromaticity RedSig_2 using the following expression (1-11), thus computing a third red chromaticity RedSig_3.

$$RedSig\_3=RedSig\_1\times RedSig\_2/128 \quad (1\text{-}11)$$

Figure 9C:
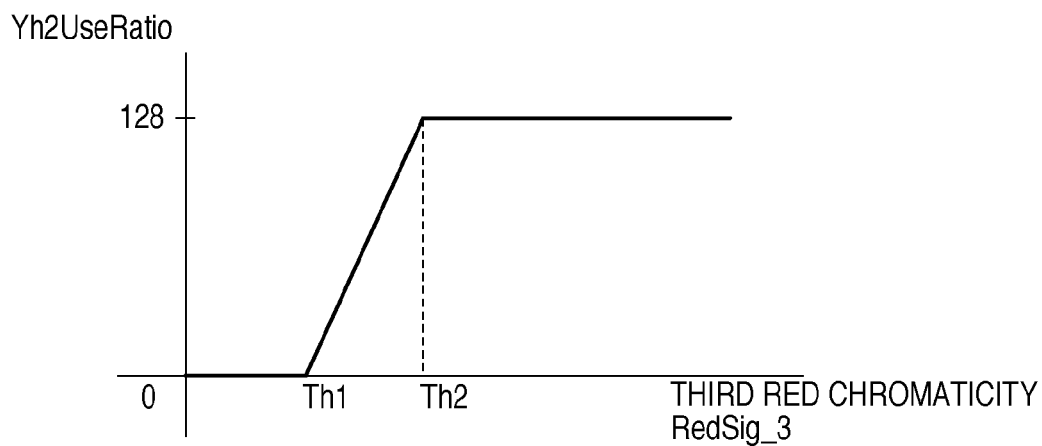
FIG. 9C is a diagram showing an example of the input/output characteristics of a second coefficient computing circuit in FIG. 8.

A second coefficient computing circuit 1314 has the input/output characteristics shown in FIG. 9C, and outputs a GR weighted-addition coefficient Yh2UseRatio based on the third red chromaticity RedSig_3.

In the example shown in FIG. 9C, if the value of the third red chromaticity RedSig_3 is in the range of 0 to a predetermined threshold value Th1 inclusive (RedSig_3<Th1), the color is not red, and therefore the GR weighted-addition coefficient Yh2UseRatio is set to 0. If the value of the third red chromaticity RedSig_3 is greater than or equal to a threshold value Th2 (Th2≦RedSig_3), the GR weighted-addition coefficient Yh2UseRatio is set to 128, which indicates red. If the value of the third red chromaticity RedSig_3 is in another range (Th1<RedSig_3<Th2), the GR weighted-addition coefficient Yh2UseRatio is set to a value obtained by performing linear interpolation between 128 and 0, and output. Th1 and Th2 can be predetermined as red chromaticity threshold values.

According to these input/output characteristics, the second luminance signal Yh_2 is used 100% for a red imaging subject, the first luminance signal Yh_1 is used 100% for a non-red imaging subject, and a ratio of the first and second luminance signals Yh_1 and Yh_2 corresponding to the red tinge is used for an intermediate color imaging subject.

Lastly, a second computing circuit 1315 computes the third luminance signal Yh_3 according to the following expressions (1-12) and (1-13) from the first luminance signal Yh_1 and the second luminance signal Yh_2 with use of the weighted-addition coefficient Yh2UseRatio. Similarly, the second GR weighted-addition circuit 132 performs weighted-addition on the first high-frequency signal AC_1 and the second high-frequency signal AC_2, thus generating the third high-frequency signal AC_3.

$$Yh\_3=(Yh\_1\times(128-Yh2UseRatio)+ Yh\_2\times Yh2UseRatio)/128 \quad (1\text{-}12)$$

$$AC\_3=(AC\_1\times(128-Yh2UseRatio)+ AC\_2\times Yh2UseRatio)/128 \quad (1\text{-}13)$$

Note that the weighted-addition coefficient Yh2UseRatio used in the second GR weighted-addition circuit 132 may be acquired from the first GR weighted-addition circuit 131. In this case, it is sufficient for the second GR weighted-addition circuit 132 to include only the second computing circuit 1315 shown in FIG. 8.

Alternatively, the second GR weighted-addition circuit 132 may compute the weighted-addition coefficient Yh2UseRatio, and the first GR weighted-addition circuit 131 may acquire the weighted-addition coefficient Yh2UseRatio from the second GR weighted-addition circuit 132. In this case, it is sufficient for the first GR weighted-addition circuit 131 to include only the second computing circuit 1315 shown in FIG. 8.

An addition circuit 133 adds the third luminance signal Yh_3 and the third high-frequency signal AC_3, and outputs the result of the addition as a final luminance signal.

The description of the present embodiment is based on the assumption that the imaging subject for which the horizontal and vertical direction resolution drops is a red imaging subject. However, there are cases in which depending on the spectral distribution characteristics of the color filter array, the output from R pixels and G pixels is substantially 0 in the case of a blue imaging object. In such a case, a luminance signal can be generated by detecting blue chromaticity in place of red chromaticity, applying similar processing for the blue imaging subject, and introducing the second luminance signal Yh_2. It is also possible to have a configuration in which the second luminance signal Yh_2 is used for both red imaging subjects and blue imaging subjects.

As described above, according to the present embodiment, in a luminance signal generation apparatus that generates a luminance signal from an image signal obtained from an image sensor that uses a primary color Bayer pattern type of color filter array, a first luminance signal is generated by limiting the vertical direction and horizontal direction bandwidth to a first range. Also, a second luminance signal is generated by limiting the vertical direction and horizontal direction bandwidth to a second range that is narrower than the first range. Thereafter, a final luminance signal is generated by performing weighted-addition on the first and second luminance signals, where the ratio of the second luminance signal is increased as the intensity of the redness or blueness of the imaging subject increases. For this reason, even in the case of a red imaging subject or a blue imaging subject, it is possible to generate a luminance signal in which the occurrence of spatial aliasing has been sufficiently suppressed.

Also, in the present embodiment, for a high-frequency signal as well, a first high-frequency signal and a second high-frequency signal having different bandwidth limiting ranges are similarly generated, and weighted-addition is performed on the first and second high-frequency signals, where the ratio of the second high-frequency signal is increased as the intensity of the redness or blueness of the imaging subject increases. Since a luminance signal is then generated with use of such high-frequency signals, even in the case of a red imaging subject or a blue imaging subject, it is possible to generate a high-resolution luminance signal in which blurring is suppressed.

Embodiment 2

Figure 10:
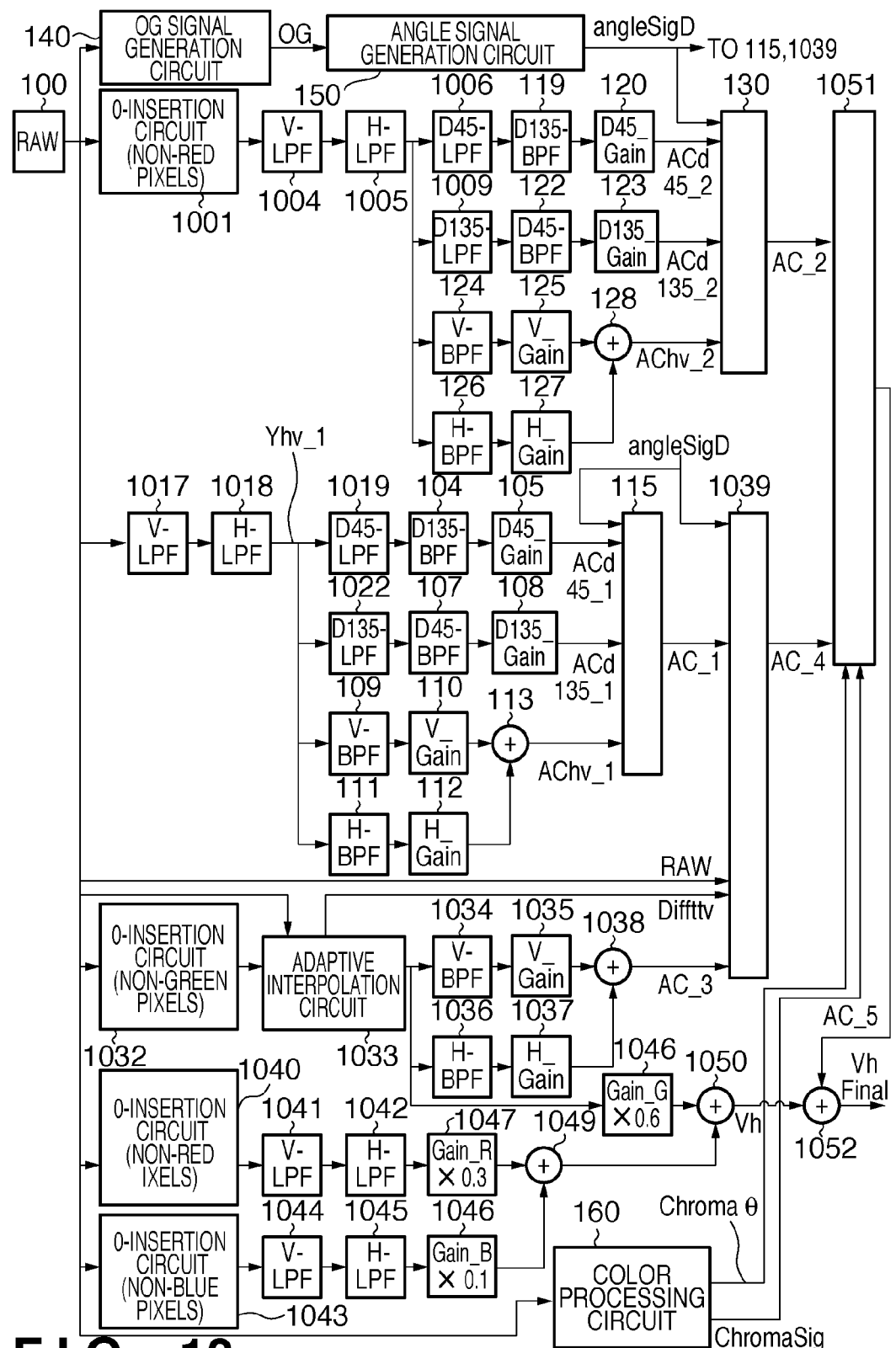
FIG. 10 is a block diagram showing an exemplary configuration of a luminance signal generation apparatus according to Embodiment 2 of the present invention.

FIG. 10 is a block diagram showing an exemplary configuration of a luminance signal generation apparatus according to Embodiment 2 of the present invention. In FIG. 10, the same reference numerals have been given to constituent elements that are the same as in Embodiment 1, and redundant descriptions thereof have been omitted. In the present embodiment, all of the low-pass filters have the frequency characteristics denoted by 200 in FIG. 2 in the directions in which bandwidth limiting is performed.

(Computation of First High-Frequency Signal)

The first high-frequency signal AC_1 is generated using the same method as in Embodiment 1.

A V-LPF 1017 and an H-LPF 1018 that are equivalent to the V-LPF 101 and the H-LPF 102 in Embodiment 1 respectively limit the vertical direction and horizontal direction bandwidth of the RAW signal 100. The V-BPF 109 and the H-BPF 111 then detect a vertical and horizontal direction edge component. The gain circuits 110 and 112 multiply the respective edge components by a pre-set gain, and the addition circuit 113 adds the resulting edge components, thus computing the first horizontal/vertical direction edge signal AChv_1.

The D135-BPF 104 extracts a 45-degree line edge component from the luminance signal Yhv_1 in which the 45-degree direction bandwidth has been limited by a D45-LPF 1019, which is equivalent to the D45-LPF 103 in Embodiment 1. Thereafter, gain adjustment is performed by the gain circuit 105, and a first 45-degree line edge signal ACd45_1 is computed.

Similarly, the D45-BPF 107 extracts a 135-degree direction edge component from the luminance signal Yhv_1 in which the 135-degree direction bandwidth has been limited by a D135-LPF 1022, which is equivalent to the D135-LPF 106 in Embodiment 1. Thereafter, gain adjustment is performed by the gain circuit 108, and a first 135-degree line edge signal ACd135_1 is computed.

The first HVD weighted-addition circuit 115 performs weighted-addition on the three edge signals with use of the weighted-addition coefficient D_UseRatio computed in Embodiment 1, thus generating the first high-frequency signal AC_1.

(Computation of Second High-Frequency Signal (For a Red Imaging Subject))

Although the second high-frequency signal of the present embodiment is generated using substantially the same method as in Embodiment 1, the method of the present embodiment differs from Embodiment 1 in that the high-frequency component is obtained with the use of a signal generated by performing 0-insertion processing on pixels other than R pixels, instead of using all pixel signals in the RAW signal 100. Setting pixels other than R pixels to 0 in this way enables preventing spatial aliasing from occurring in luminance signals having a very small amplitude from colors of pixels other than R pixels. The present embodiment also differs from Embodiment 1 in that the vertical direction and horizontal direction bandwidth of the RAW signal is limited similarly to the first high-frequency signal.

A 0-insertion circuit 1001 replaces pixel signal values of pixels other than R pixels in the RAW signal 100 with zeros. Thereafter, a V-LPF 1004 and an H-LPF 1005 limit the vertical direction and horizontal direction bandwidth so as to be less than or equal to the Nyquist frequency. The V-BPF 124 and the H-BPF 126 then detect a vertical and horizontal direction edge component, the gain circuits 125 and 127 multiply the edge components by a gain, and the addition circuit 128 adds the resulting edge components, thus generating the edge signal AChv_2.

The D135-BPF 119 extracts a 45-degree line edge component from the image signal in which the 45-degree direction bandwidth has been limited by a D45-LPF 1006, and the gain circuit 120 performs gain adjustment, thus computing the edge signal ACd45_2. Similarly, the D45-BPF 122 extracts a 135-degree direction edge component from the image signal in which the 135-degree direction bandwidth has been limited by a D135-LPF 1009, and the gain circuit 123 performs gain adjustment, thus generating the edge signal ACd135_2.

The second HVD weighted-addition circuit 130 performs weighted-addition on the three edge signal with use of the weighted-addition coefficient D_UseRatio, thus generating the second edge signal AC_2.

(Computation of Third High-Frequency Signal)

In Embodiment 1, resolution in the vicinity of the Nyquist frequency in the horizontal and vertical direction degrades since a high-frequency signal is computed with use of an SWY signal. In view of this, degradation in resolution in the vicinity of the Nyquist frequency is prevented by generating a third high-frequency signal with use of an adaptively interpolated OG signal.

A high-frequency signal is generated from image signals of green pixels by a 0-insertion circuit 1032 to an addition circuit 1038.

The 0-insertion circuit 1032 replaces the pixel signal values of pixels other than G pixels in the RAW signal 100 with zeros, and an adaptive interpolation circuit 1033 performs adaptive interpolation on the resulting RAW signal 100 in which zeros have been inserted, thus generating an adaptive OG signal.

Figure 11:
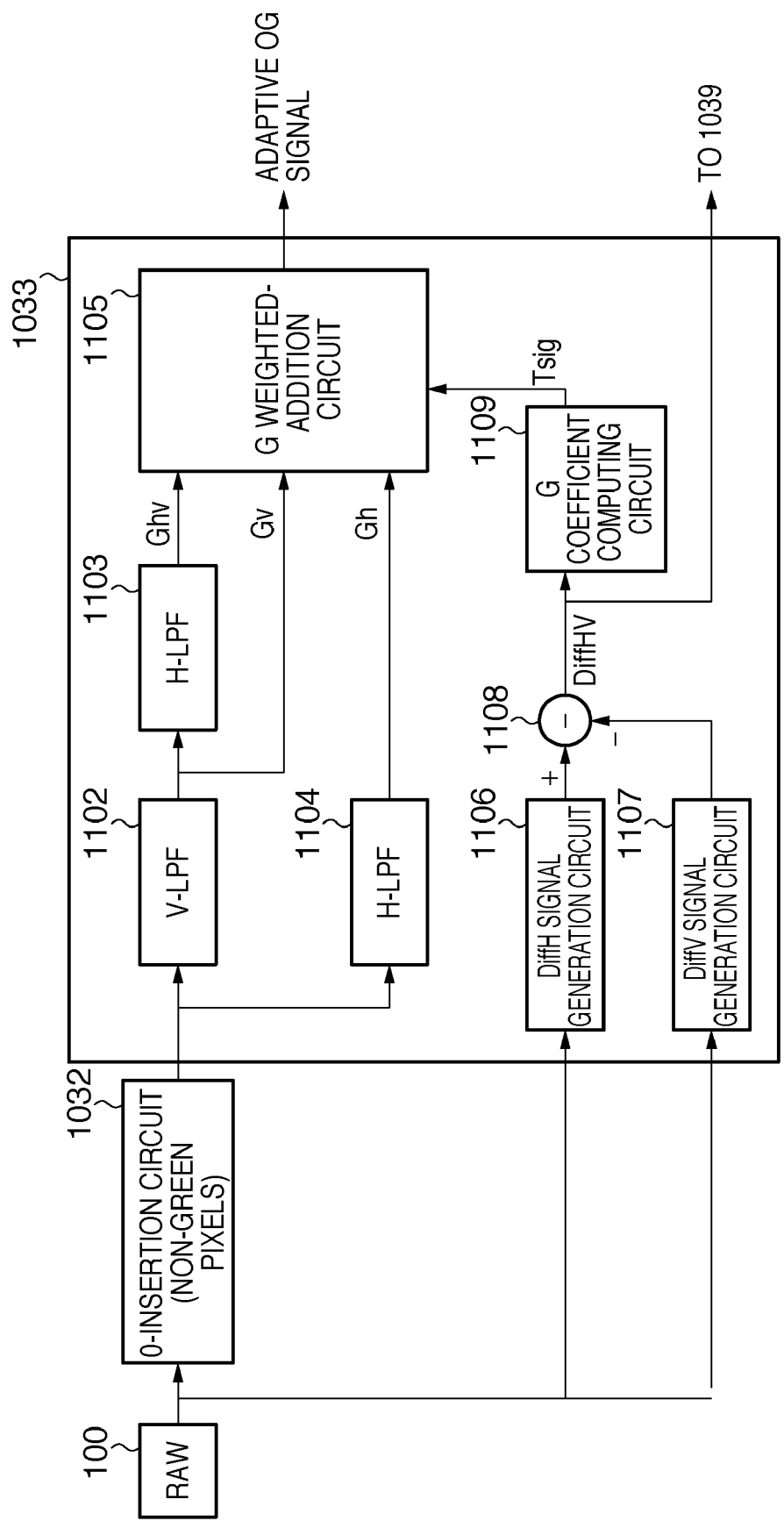
FIG. 11 is a block diagram showing an exemplary configuration of an adaptive interpolation circuit in the luminance signal generation apparatus according to Embodiment 2 of the present invention.

FIG. 11 is a block diagram showing an exemplary configuration of the adaptive interpolation circuit 1033 in the present embodiment.

The adaptive interpolation circuit 1033 receives as input both the RAW signal 100 in which the pixel signal values of pixels other than G pixels have been replaced with zeros by the 0-insertion circuit 1032, and the RAW signal 100 before replacing has been performed.

A V-LPF 1102 limits the vertical direction bandwidth of the RAW signal 100 in which pixel signal values have been replaced with zeros, thus generating a Gv signal. The Gv signal is input to a G weighted-addition circuit 1105 as well as to an H-LPF 1103. The H-LPF 1103 limits the horizontal direction bandwidth of the Gv signal, thus generating a Ghv signal in which the vertical direction and horizontal direction bandwidth have been limited. The Ghv signal is input to the G weighted-addition circuit 1105. An H-LPF 1104 limits the horizontal direction bandwidth of the RAW signal 100 in which pixel signal values have been replaced with zeros, thus generating a Gh signal, and inputs the Gh signal to the G weighted-addition circuit 1105.

In this way, (1) the Gv signal in which the vertical direction bandwidth has been limited, (2) the Gh signal in which the horizontal direction bandwidth has been limited, and (3) the Ghv signal in which the vertical and horizontal direction bandwidth has been limited are generated from the signal in which the pixel signal values of pixels other than G pixels have been replaced with zeros, and the Gv signal, the Gh signal, and the Ghv signal are input to the G weighted-addition circuit 1105.

Meanwhile, a DiffH signal generation circuit (DiffH) 1106 and a DiffV signal generation circuit (DiffV) 1107 respectively generate a DiffH signal and a DiffV signal from the RAW signal 100 in which zeros have not been inserted, in the way described below.

Figures 12, 13:
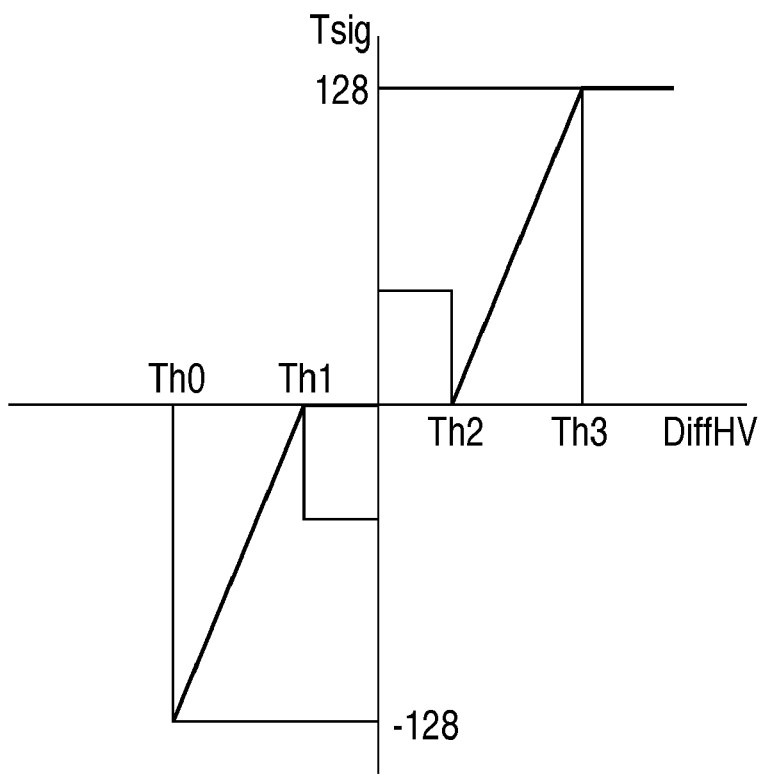
FIG. 12 is a diagram illustrating operations performed by a DiffH signal generation circuit and a DiffV signal generation circuit in FIG. 11.
FIG. 13 is a diagram showing an example of the input/output characteristics of a G coefficient computing circuit in FIG. 11.

FIG. 12 is a diagram illustrating operations performed by the DiffH signal generation circuit 1106 and the DiffV signal generation circuit 1107. Assuming that the pixel of interest is P22, the DiffH signal generation circuit 1106 and the DiffV signal generation circuit 1107 respectively generate the DiffH signal and the DiffV signal using the following expressions (2-1) and (2-2).

$$\text{Diff}H=|P21-P23|+|2\times P22-P20-P24| \quad (2\text{-}1)$$

$$\text{Diff}V=|P12-P32|+|2\times P22-P02-P42| \quad (2\text{-}2)$$

Note that P12 to P42 in the expressions are the signal values of corresponding pixels in FIG. 12.

The DiffH signal is high if the imaging subject is vertically striped, and the value of the DiffV signal is high if the imaging subject is horizontally striped. A subtractor 1108 subtracts the DiffV signal from the DiffH signal, and outputs a DiffHV signal indicating the extent to which the pixel of interest corresponds to an oblique line.

In other words, DiffHV is obtained as shown below.

$$\text{Diff}HV=\text{Diff}H-\text{Diff}V$$

A G coefficient computing circuit (Tsig) 1109 computes a weighted-addition coefficient based on the DiffHV signal, and provides the weighted-addition coefficient to the G weighted-addition circuit 1105.

FIG. 13 is a diagram showing an example of the input/output characteristics of the G coefficient computing circuit 1109.

The horizontal axis indicates the DiffHV signal, and the vertical axis indicates values of the weighted-addition coefficient Tsig. If DiffHV$\leq$Th0, DiffV is greater than DiffH, and therefore the region is determined to be a horizontally striped region. In this case, the G coefficient computing circuit 1109 outputs a Tsig value (Tsig=−128) indicating that the G weighted-addition circuit 1105 will 100% use the Gh signal.

In the section where Th1<DiffHV<Th2, DiffV and DiffH have values that are close to each other, and therefore the region is determined to be a diagonal region. In this section, the G coefficient computing circuit 1109 outputs a Tsig value (Tsig=0) indicating that the G weighted-addition circuit 1105 will 100% use the Ghv signal.

Furthermore, if DiffHV$\geq$Th3, DiffH is greater than DiffV, and therefore the region is determined to be a vertically striped region. In this case, the G coefficient computing circuit 1109 outputs a Tsig value (Tsig=128) indicating 100% use of the Gv signal.

In the section where Th0<DiffHV$\leq$Th1, the G coefficient computing circuit 1109 outputs a Tsig determined such that there is a linear change from −128 to 0. Similarly, in the section where Th2$\leq$DiffHV<Th3, the G coefficient computing circuit 1109 outputs a Tsig determined such that there is a linear change from 0 to 128.

Based on a Tsig value determined in this way, the G weighted-addition circuit 1105 performs weighted-addition on the Gh signal, the Gv signal, and the Ghv signal using the following expressions (2-3) and (2-4), thus generating an adaptive OG signal.

When Tsig$\geq$0, $$DC\_OG=(Gv\times Tsig+Ghv\times(128-Tsig))/128 \quad (2\text{-}3)$$

When Tsig<0, $$DC\_OG=(Gh\times|Tsig|+Ghv\times(128-|Tsig|))/128 \quad (2\text{-}4)$$

A V-BPF 1034 detects a vertical direction edge component in the adaptive OG signal generated by the adaptive interpolation circuit 1033, and gain adjustment is performed by a gain circuit 1035. Meanwhile, an H-BPF 1036 detects a horizontal direction edge component in the adaptive OG signal, and gain adjustment is performed by a gain circuit 1037. The vertical and horizontal edge components resulting from the gain adjustment are added by an addition circuit 1038, and the result is sent to a diagonal weighted-addition circuit 1039 as the third high-frequency signal AC_3.

(Weighted-Addition of First and Third High-Frequency Signals)

The diagonal weighted-addition circuit 1039 performs weighted-addition on the first high-frequency signal AC_1 generated from all colors of pixels (SWY signal) and the third high-frequency signal AC_3 generated from the adaptive OG signal using the following expression (2-5), thus generating a fourth high-frequency signal AC_4.

$$AC\_4=(AC\_3\times(128-\text{SWYUseRatio})+ \\ AC\_1\times\text{SWYUseRatio})/128 \quad (2\text{-}5)$$

Figure 14:
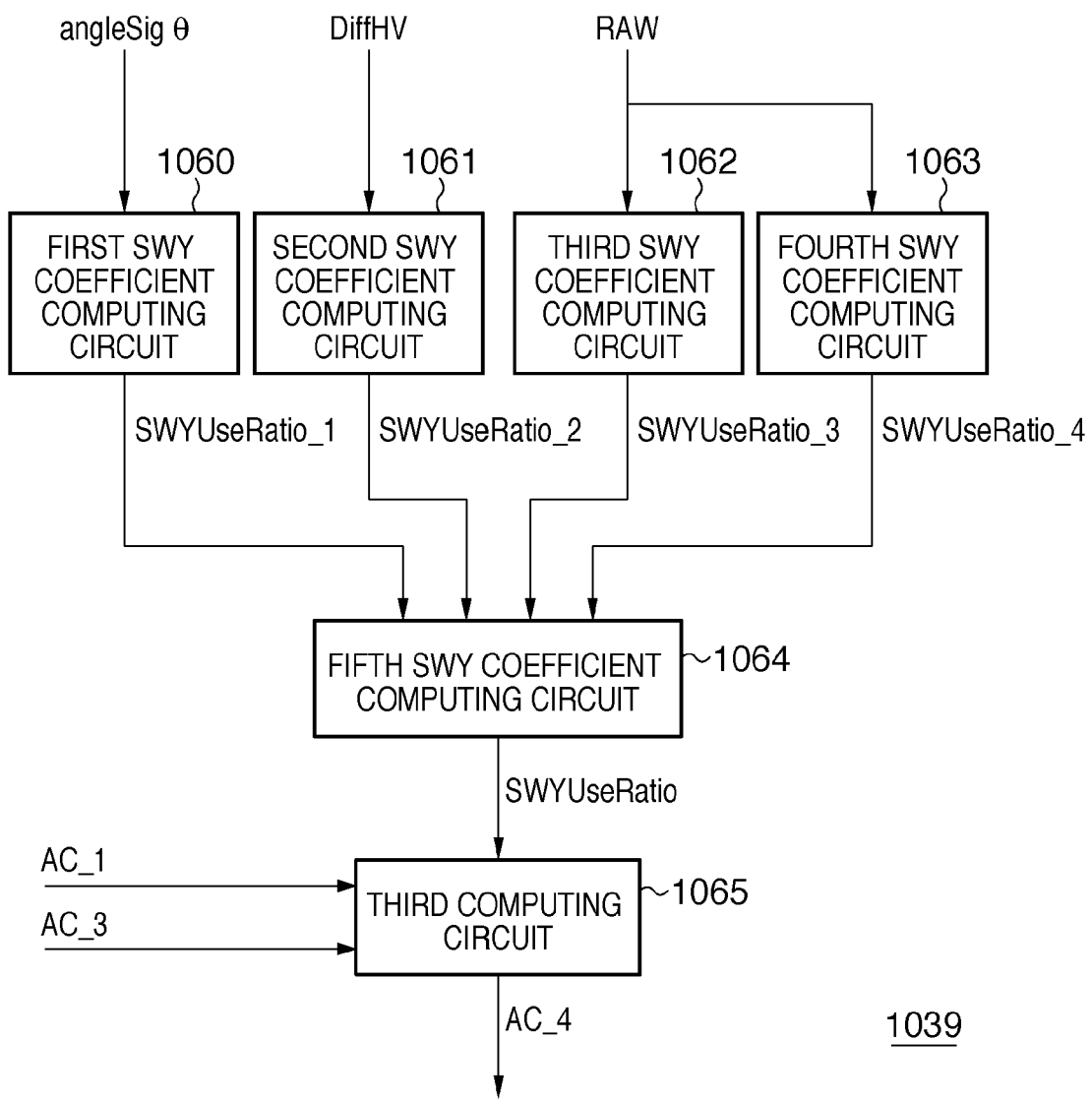
FIG. 14 is a block diagram showing an exemplary configuration of a diagonal weighted-addition circuit in the luminance signal generation apparatus according to Embodiment 2 of the present invention.

FIG. 14 is a block diagram showing an exemplary configuration of the diagonal weighted-addition circuit 1039 of the present embodiment.

In the diagonal weighted-addition circuit 1039, first to fourth SWY coefficients SWYUseRatio_1 to SWYUseRatio_4 are obtained by first to fourth SWY coefficient computing circuits 1060 to 1063. Thereafter, a fifth SWY coefficient computing circuit 1064 obtains a final weighted-addition coefficient SWYUseRatio from the first to fourth SWY coefficients SWYUseRatio_1 to SWYUseRatio_4. A third computing circuit 1065 performs weighted-addition using the expression (2-5) described above, thus obtaining the fourth high-frequency signal AC_4.

(1) Computation of SWYUseRatio_1 (First SWY Coefficient)

Figure 15:
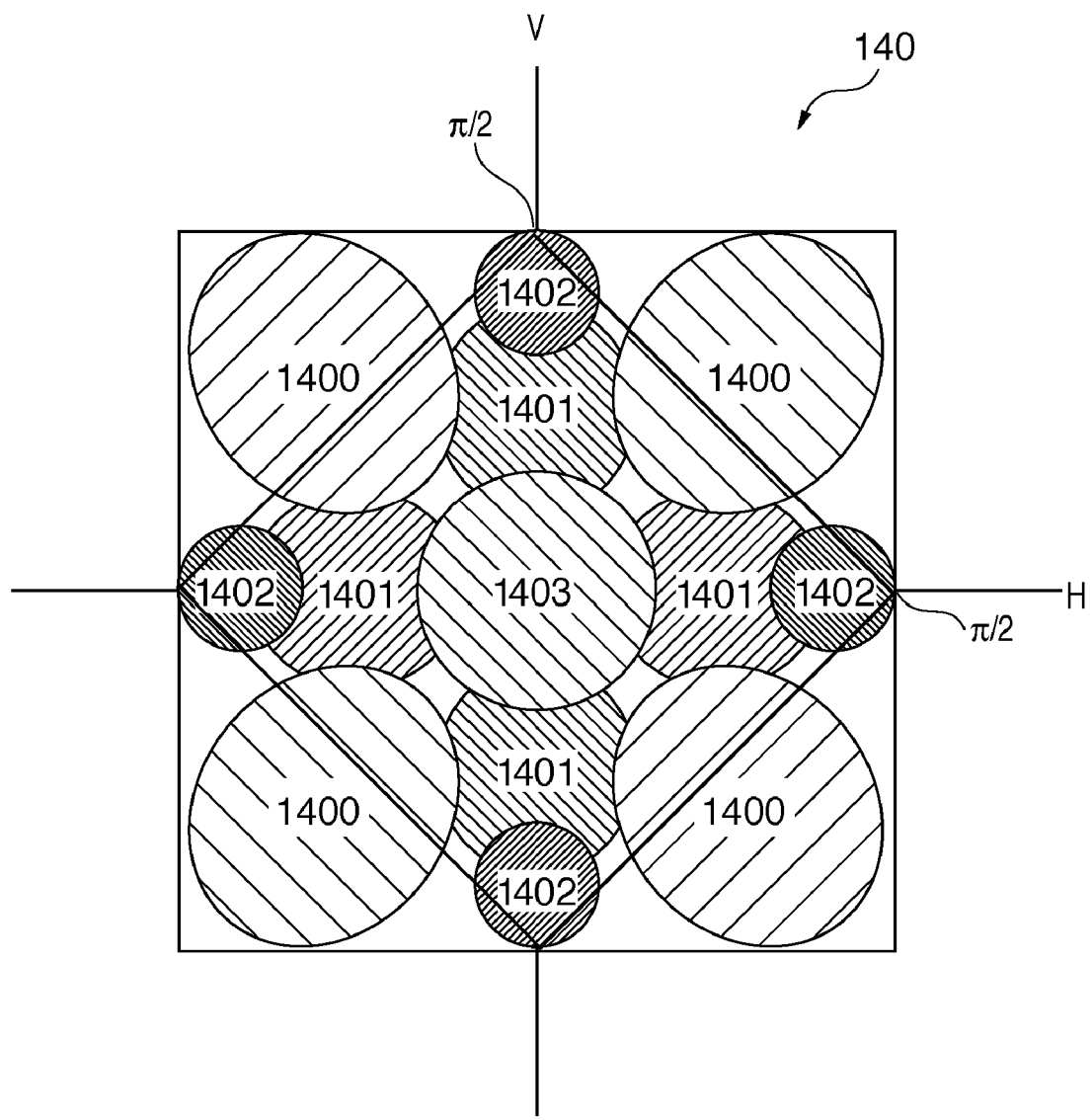
FIG. 15 is a diagram showing a resolvable frequency space of an adaptive OG signal and an SWY signal.

FIG. 15 is a diagram showing a resolvable frequency space of an adaptive OG signal and an SWY signal.

Here, the regions in which the third high-frequency signal AC 3 is influenced by spatial aliasing are diagonal regions 1400. Therefore, replacing the diagonal regions 1400 with the first high-frequency signal AC_1 enables generating a fourth high-frequency signal AC_4 that has no spatial aliasing. Accordingly, the weighted-addition coefficient can be computed using the angle signal angleSigD used in Embodiment 1.

The angle signal angleSigD represents a 45-degree line if positive and represents a 135-degree line if negative, and is characterized in that the larger the absolute quantity of the signal value, the closer to 45 degrees and 135 degrees, and the smaller the absolute quantity of the signal value, the closer to 0 degrees and 90 degrees.

This enables the first SWY coefficient computing circuit 1060 to obtain the first SWY coefficient SWYUseRatio_1 from the angle signal angleSigD. Specifically, it is sufficient to provide the first SWY coefficient computing circuit 1060 with input/output characteristics that are similar to the first coefficient computing circuit 1141 used in Embodiment 1 (in FIG. 6, the output value D_UseRatio is replaced with SWYUseRatio_1).

(2) Computation of SWYUseRatio_2 (Second SWY Coefficient)

The third high-frequency signal AC_3 generated from the adaptive OG signal is used for horizontal/vertical regions 1401 shown in FIG. 15. This is due to the fact that since the third high-frequency signal AC_3 is based on the adaptive OG signal, the resolution is more favorable than when using the second high-frequency signal AC_2 generated from an SWY signal in which the bandwidth has necessarily been limited in both the horizontal and vertical direction.

The horizontal/vertical regions 1401 can be determined with use of the DiffH signal and the DiffV signal described with reference to FIG. 11 and FIG. 12. As described above, when the imaging subject is vertically striped, the value of DiffH is high and the value of DiffV is 0. Also, when the imaging subject is horizontally striped, the value of DiffV is high and the value of DiffH is 0.

Figure 19A:
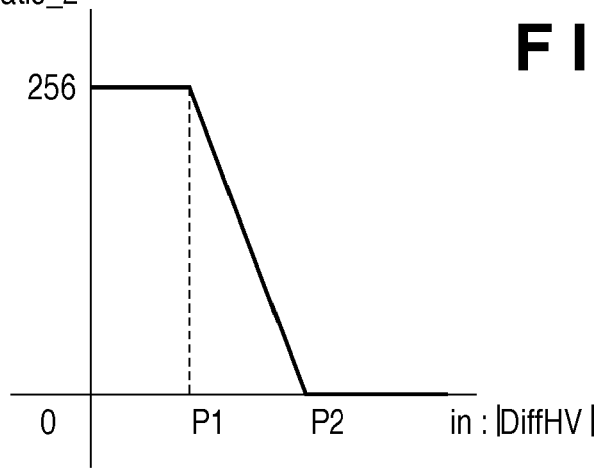
FIG. 19A is a diagram showing an example of the input/output characteristics of a second SWY coefficient computing circuit in FIG. 14.

Therefore, using a second SWY coefficient computing circuit 1061 that has the input/output characteristics shown in FIG. 19A enables computing the second SWY coefficient SWYUseRatio 2 from the DiffHV signal. In FIG. 19A, from 0 to P1, the value of the input signal |DiffHV| is low, which indicates a diagonal line, and the second SWY coefficient SWYUseRatio_2 is set to 128. When the value of the input signal |DiffHV| is P2 or greater, this indicates that the region is entirely horizontally striped or vertically striped, and the second SWY coefficient SWYUseRatio_2 is set to 0. In the section from P1 to P2, the second SWY coefficient SWYUseRatio_2 is set to a value obtained by performing linear interpolation between 128 and 0.

(3) Computation of SWYUseRatio_3 (Third SWY Coefficient)

For the same reason as in (2), the third high-frequency signal AC_3 is used for regions (Nyquist regions) 1402 in the vicinity of the horizontal and vertical Nyquist frequencies shown in FIG. 15. The Nyquist regions 1402 can be determined by detecting a phase shift between a G1 pixel signal and a G2 pixel signal.

Figure 16:
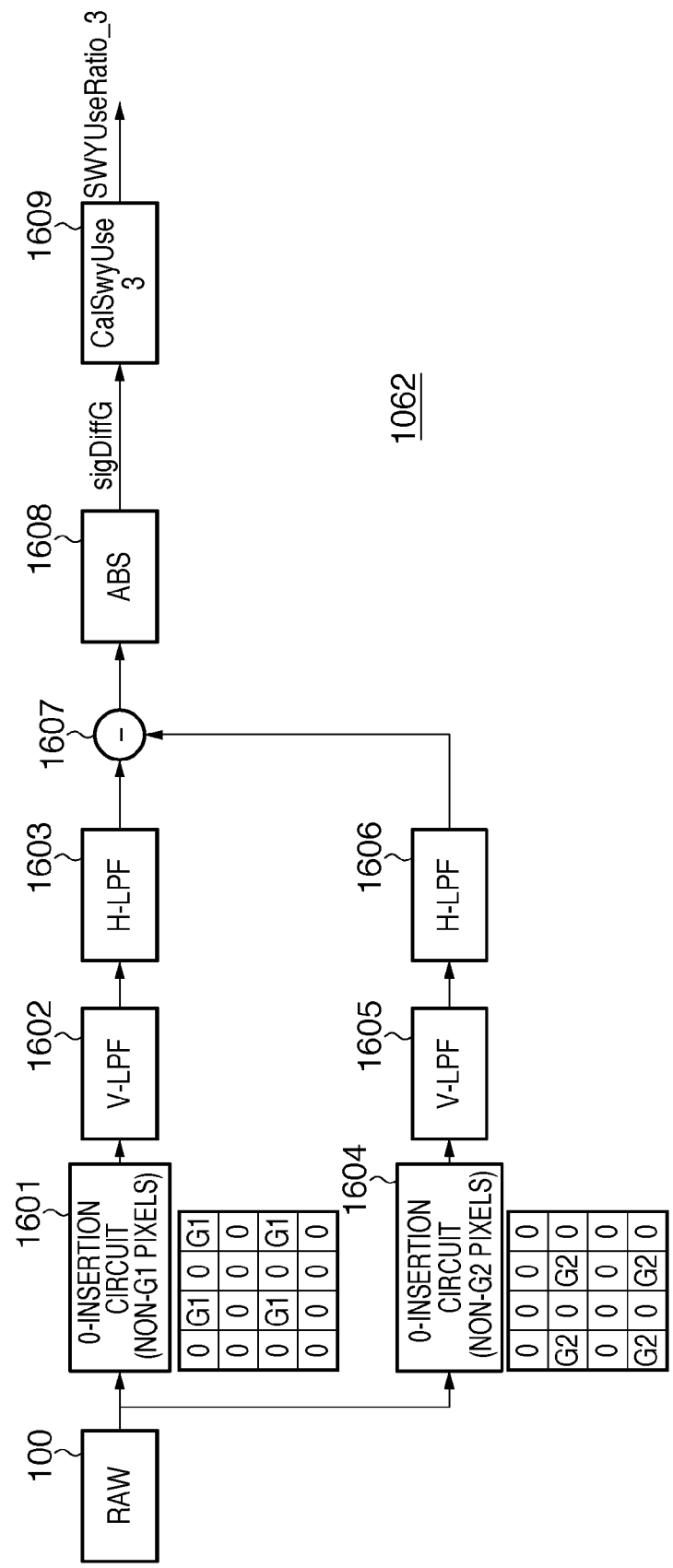
FIG. 16 is a block diagram showing an exemplary configuration of a third SWY coefficient computing circuit in FIG. 14.

FIG. 16 is a block diagram showing an exemplary configuration of a third SWY coefficient computing circuit 1062.

A 0-insertion circuit 1601 and a 0-insertion circuit 1604 respectively generate signals in which pixel signal values of pixels other than G1 pixels and G2 pixels in the RAW signal 100 have been replaced with zeros. Low-pass filters (a V-LPF 1602, an H-LPF 1603, a V-LPF 1605, and an H-LPF 1606), which are for horizontal and vertical direction interpolation, interpolate values for the pixels whose values were replaced with zeros.

Next, a subtraction circuit 1607 obtains a difference between an interpolated G1 signal (the output of the H-LPF 1603) and an interpolated G2 signal (the output of the H-LPF 1606), and an absolute value circuit (abs) 1608 obtains an absolute value of the difference, and outputs the absolute value of the difference as a region determination signal sigDiffG.

Figure 19B:
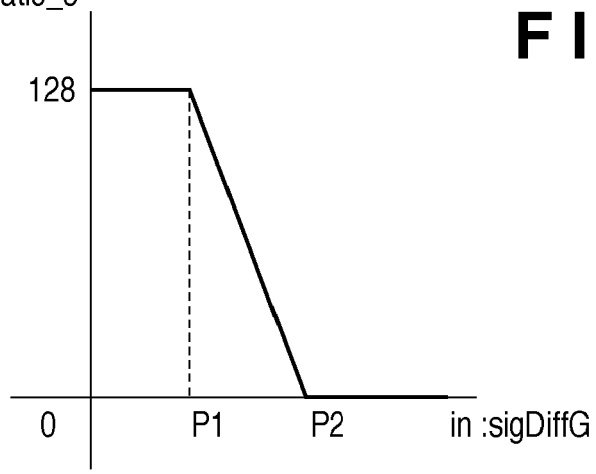
FIG. 19B is a diagram showing an example of the input/output characteristics of a CalSwyUse3 in FIG. 16.

A third SWY coefficient SWYUseRatio_3 is computed from the region determination signal sigDiffG with use of a CalSwyUse3 1609 having the input/output characteristics shown in FIG. 19B. The CalSwyUse3 1609 may be a computing circuit or a table.

From 0 to P1, the value of the region determination signal sigDiffG is low, which indicates a diagonal line, and the third SWY coefficient SWYUseRatio_is set to 128. When the value of the region determination signal sigDiffG is P2 or greater, this indicates that the region is entirely horizontally striped or vertically striped, and the third SWY coefficient SWYUseRatio_3 is set to 0. In the section from P1 to P2, the third SWY coefficient SWYUseRatio_3 is set to a value obtained by performing linear interpolation between 128 and 0.

(4) Computation of SWYUseRatio_4 (Fourth SWY Coefficient)

The first high-frequency signal AC_1 is used for a low-frequency region 1403 shown in FIG. 15. The low-frequency region 1403 can be detected by applying a filter for detecting a low-frequency region to the RAW signal.

Figure 17:
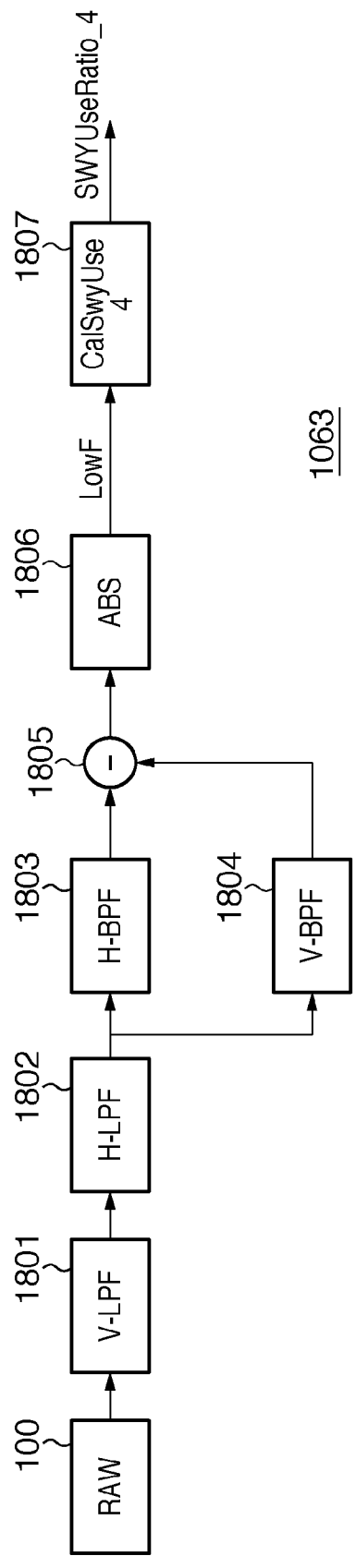
FIG. 17 is a block diagram showing an exemplary configuration of a fourth SWY coefficient computing circuit in FIG. 14.

FIG. 17 is a block diagram showing an exemplary configuration of a fourth SWY coefficient computing circuit 1063.

A V-LPF 1801 and an H-LPF 1802 limit the vertical direction and horizontal direction bandwidth of the RAW signal 100. Thereafter, a horizontal direction band-pass filter (H-BPF) 1803 and a vertical direction band-pass filter (V-BPF) 1804 are furthermore individually applied. A subtractor 1805 then subtracts the output of the V-BPF 1804 from the output of the H-BPF 1803. An absolute value circuit (abs) 1806 computes an absolute value of the result of the subtraction, and outputs the absolute value as a low-frequency region detection signal LowF.

Figure 19C:
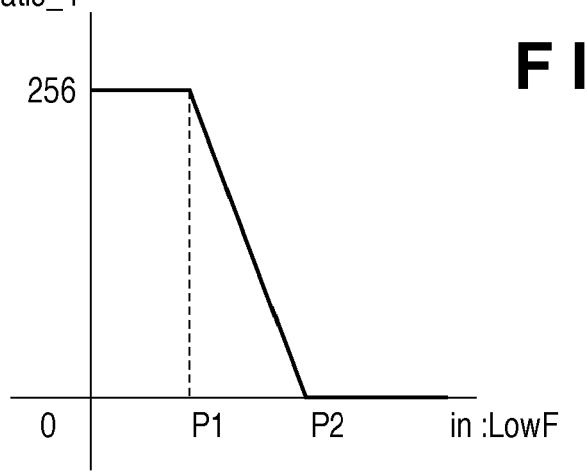
FIG. 19C is a diagram showing an example of the input/output characteristics of a CalSwyUse4 in FIG. 17.

Thereafter, a fourth SWY coefficient SWYUseRatio_4 is computed with use of a CalSwyUse4 1807 having the input/output characteristics shown in FIG. 19C. The CalSwyUse4 1807 may be a computing circuit or a table.

From 0 to P1, the value of the low-frequency region detection signal LowF is low, which indicates a high-frequency region, and the fourth SWY coefficient SWYUseRatio_4 is set to 128. When the value of the low-frequency region detection signal LowF is P2 or greater, this indicates a low-frequency region, and the fourth SWY coefficient SWYUseRatio_4 is set to 0. In the section from P1 to P2, the fourth SWY coefficient SWYUseRatio_4 is set to a value obtained by performing linear interpolation between 128 and 0.

The fifth SWY coefficient computing circuit 1064 computes a final weighted-addition coefficient SWYUseRatio from the first to fourth SWY coefficients SWYUseRatio_1 to SWYUseRatio_4.

Figure 18:
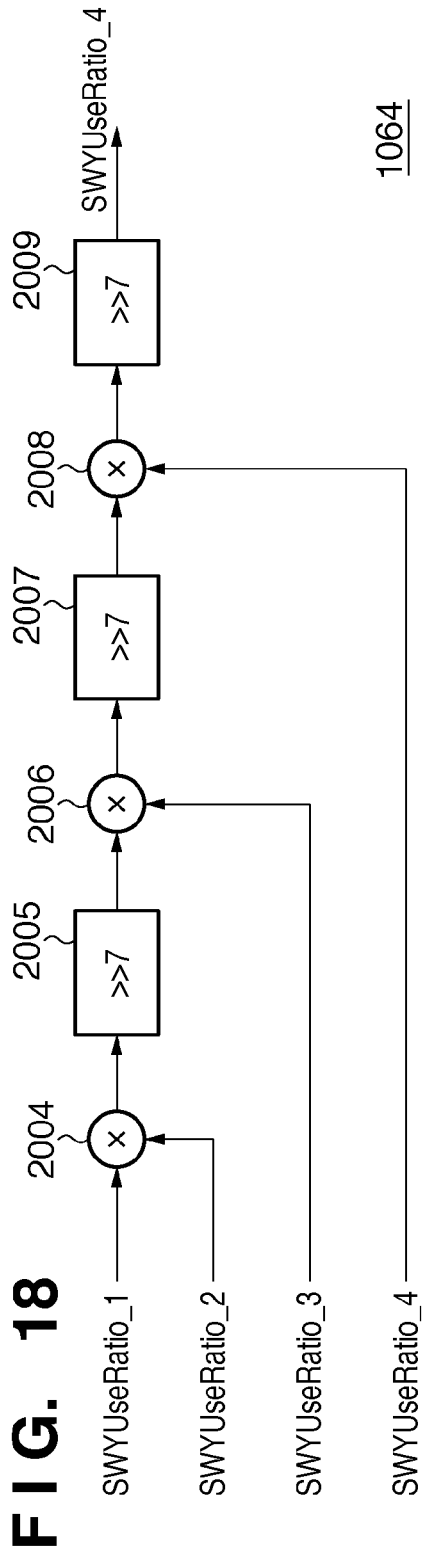
FIG. 18 is a block diagram showing an exemplary configuration of a fifth SWY coefficient computing circuit in FIG. 14.

FIG. 18 is a block diagram showing an exemplary configuration of the fifth SWY coefficient computing circuit 1064.

A multiplier 2004 multiplies the first SWY coefficient SWYUseRatio_1 and the second SWY coefficient SWYUseRatio_2, and a shifter 2005 performs a 7-bit shift operation in the rightward direction. As a result of the shifter 2005, the output of the multiplier 2004 is reduced to 1/128 of the original.

A multiplier 2006 multiplies the output of the shifter 2005 by the third SWY coefficient SWYUseRatio_3, and a shifter 2007 performs a 7-bit shift operation in the rightward direction on the result of the multiplication. Lastly, a multiplier 2008 multiplies the output of the shifter 2007 by the fourth SWY coefficient SWYUseRatio_4, and the result of the multiplication is output as the final weighted-addition coefficient SWYUseRatio.

In other words, SWYUseRatio is obtained as shown below.

SWYUseRatio=$SWY$UseRatio_1*$SWY$UseRatio_2/128*$SWY$UseRatio_3/128*$SWY$UseRatio_4*/128

The third computing circuit 1065 performs weighted-addition using the expression (2-5) described above, thus obtaining the fourth high-frequency signal from the first and third high-frequency signals and AC_3.

(Weighted-Addition of Second and Fourth High-Frequency Signals)

A third GR weighted-addition circuit 1051 shown in FIG. 10 performs weighted-addition on the fourth high-frequency signal AC_4 and the second high-frequency signal AC_2 using the following expression (2-6), thus generating a fifth high-frequency signal AC_5. The third GR weighted-addition circuit 1051 may have the same configuration as the second GR weighted-addition circuit 132 of Embodiment 1 shown in FIG. 8, with the exception that AC_1 is replaced with AC_4, is replaced with AC_5, and the name of the weighted-addition coefficient is AC2UseRatio.

$AC\_5=(AC\_4\times(128-AC2UseRatio)+AC\_2\times AC2UseRatio)/128$ (2-6)

(Generation of Final Luminance Signal)

Returning now to FIG. 10, the adaptive OG signal generated by the adaptive interpolation circuit 1033 is provided to a gain circuit 1046 as well. The gain circuit 1046 multiplies the adaptive OG signal by a gain of 0.6 times, and outputs the result.

Meanwhile, a 0-insertion circuit 1040 replaces the pixel signal values of pixels other than R pixels in the RAW signal 100 with zeros, a V-LPF 1041 and an H-LPF 1042 perform an interpolation operation thereon, and the resulting signal is provided to a gain circuit 1047. The gain circuit 1047 multiplies the R signal by a gain of 0.3 times, and outputs the result.

Furthermore, a 0-insertion circuit 1043 replaces the pixel signal values of pixels other than B pixels in the RAW signal 100 with zeros, a V-LPF 1044 and an H-LPF 1045 perform an interpolation operation thereon, and the resulting signal is provided to a gain circuit 1048. The gain circuit 1048 multiplies the B signal by a gain of 0.1 times, and outputs the result.

An addition circuit 1049 adds the output signals of the gain circuits 1047 and 1048, and an addition circuit 1050 adds the resulting signal to the output signal of the gain circuit 1046, thus generating a luminance signal Yh.

Thereafter, an addition circuit 1052 adds the fifth high-frequency signal AC_5 and the luminance signal Yh, thus generating a final luminance signal YhFinal that has been edge-emphasized.

As described above, in the present embodiment, in a diagonal region in which the third high-frequency signal is generated from only the signals of G pixels, weighted-addition is performed such that the third high-frequency signal is replaced with the first high-frequency signal generated from the signals of all colors of pixels (RGB pixels), thus generating a fourth high-frequency signal for the diagonal region. Therefore, the diagonal resolution of a conventional OG signal is replaced with an SWY signal, thus significantly improving the resolution.

Furthermore, separately from the fourth high-frequency signal, the second high-frequency signal is generated using only the signals of R pixels, and weighted-addition of these two signals is performed such that the second high-frequency signal is weighted more as the red chromaticity indicating the degree of redness of the imaging subject increases, thus generating a final high-frequency signal. Therefore, the resolution of a diagonal region is improved even with a red imaging subject, and furthermore it is possible to generate an edge-emphasized luminance signal.

Note that the method of performing weighted-addition on the second high-frequency signal and the fourth high-frequency signal is not limited to the method described above. It is also possible to have a configuration in which weighted-addition is performed on the second high-frequency signal and the fourth high-frequency signal by applying a higher gain to the second high-frequency signal as the red chromaticity indicating the degree of redness of the imaging subject increases, and then adding the second high-frequency signal resulting from the multiplication by the gain to the fourth high-frequency signal. There are cases in which performing such weighted-addition enables generating a favorable luminance signal from the output of an image sensor including a color filter array whose spectral characteristics are such that a certain extent of output can be obtained from G pixels even in the case of a red imaging subject.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2008-203444, filed on Aug. 6, 2008, which is hereby incorporated by reference herein its entirety.

What is claimed is:

1. A luminance signal generation apparatus that generates a luminance signal for each pixel from an image signal read from an image sensor that includes a primary color Bayer pattern type of color filter array, the luminance signal generation apparatus comprising:
  a first signal generating unit configured to generate a first signal from a first image signal that was generated by limiting a spatial frequency bandwidth of the image signal;
  a second signal generating unit configured to generate a second signal from a second image signal that was generated by limiting the spatial frequency bandwidth of the image signal to a lower bandwidth than the first image signal;
  a computing unit configured to compute, from the image signal read from the image sensor, a color intensity measure for a pixel of interest, the measure indicating an intensity of a predetermined color of the pixel of interest; and
  a first adding unit configured to generate an output luminance signal for the pixel of interest using a third signal that was generated by adding the first signal and the second signal such that, based on the color intensity measure, the second signal is weighted more as the intensity of the predetermined color of the pixel of interest increases.

2. The luminance signal generation apparatus according to claim 1, wherein the predetermined color is red or blue; and wherein the second signal is weighted more as the intensity of redness or blueness of the pixel of interest increases.

3. The luminance signal generation apparatus according to claim 2, further comprising:
  a first low-pass filter for limiting the spatial frequency bandwidth of the image signal; and
  a second low-pass filter for limiting the spatial frequency bandwidth of the image signal to a bandwidth lower than the first low-pass filter,
  wherein the first signal is a first luminance signal that was generated from the first image signal output by the first low-pass filter, and
  the second signal is a second luminance signal that was generated from the second image signal output by the second low-pass filter.

4. The luminance signal generation apparatus according to claim 3, further comprising:
  a first high-frequency signal generating unit configured to generate a first high-frequency signal from the first image signal output by the first low-pass filter;
  a second high-frequency signal generating unit configured to generate a second high-frequency signal from the second image signal output by the second low-pass filter;
  a second adding unit configured to generate a third high-frequency signal by adding the first high-frequency signal and the second high-frequency signal such that, based on the color intensity measure, the second high-frequency signal is weighted more as the intensity of the redness or the blueness of the pixel of interest increases; and
  a third adding unit configured to generate an edge-emphasized luminance signal for the pixel of interest by adding the output luminance signal and the third high-frequency signal.

5. The luminance signal generation apparatus according to claim 3,
  wherein the first low-pass filter limits the spatial frequency of the image signal so as to be lower than or equal to a Nyquist frequency of the image sensor, and
  the second low-pass filter limits the spatial frequency of the image signal so as to be lower than or equal to half the Nyquist frequency.

6. The luminance signal generation apparatus according to claim 1, further comprising:
  a luminance signal generating unit configured to generate a luminance signal from the image signal,
  wherein the first signal is a first high-frequency signal that was generated with use of image signals from all colors of pixels of the image sensor, the second signal is a second high-frequency signal that was generated with use of an image signal from one of a red pixel and a blue pixel of the image sensor, and
  the first adding unit generates the output luminance signal for the pixel of interest by adding the third signal for the pixel of interest to the luminance signal for the pixel of interest that was generated by the luminance signal generating unit.

7. The luminance signal generation apparatus according to claim 6, further comprising:
  a third high-frequency signal generating unit configured to generate a third high-frequency signal from an image signal of a green pixel of the image sensor;
  an obliqueness detecting unit configured to detect a degree to which the pixel of interest corresponds to an oblique line; and
  a second adding unit configured to generate a fourth high-frequency signal by adding the first high-frequency signal and the third high-frequency signal such that the third high-frequency signal is weighted more as the degree to which the pixel of interest corresponds to the oblique line increases,
  wherein the first adding unit generates the third signal by adding the fourth high-frequency signal instead of the first high-frequency signal to the second high-frequency signal.

8. An image capturing apparatus comprising:
  an image sensor including a primary color Bayer pattern type of color filter array; and
  the luminance signal generation apparatus according to claim 1.

9. A luminance signal generation method for generating a luminance signal for each pixel from an image signal read from an image sensor that includes a primary color Bayer pattern type of color filter array, the luminance signal generation method comprising:
  a first luminance signal generating step of generating a first signal from a first image signal that was generated by limiting a spatial frequency bandwidth of the image signal read from the image sensor;
  a second luminance signal generating step of generating a second signal from a second image signal that was generated by limiting the spatial frequency bandwidth of the image signal read from the image sensor to a lower bandwidth than the first image signal;
  a computing step of computing, from the image signal read from the image sensor, a color intensity measure for a pixel of interest, the measure indicating an intensity of a predetermined color of the pixel of interest; and a first adding step of generating an output luminance signal for the pixel of interest with a third signal that was generated by adding the first signal and the second signal such that, based on the color intensity measure, the second signal is weighted more as the intensity of the predetermined color of the pixel of interest increases.

10. The luminance signal generation method according to claim 9, wherein the predetermined color is red or blue; and wherein the second signal is weighted more as the intensity of redness or blueness of the pixel of interest increases.

11. A computer-readable recording medium storing the computer-executable instructions which, when executed by a computer, cause the computer to carry out the method of claim 9.

* * * * *